United States Patent
Liang et al.

(10) Patent No.: US 10,557,752 B2
(45) Date of Patent: *Feb. 11, 2020

(54) FLAME DETECTOR COVERAGE VERIFICATION SYSTEM FOR FLAME DETECTORS AND HAVING A HUB STRUCTURE FOR TEMPORARY ATTACHMENT TO THE DETECTORS

(71) Applicant: General Monitors, Inc., Lake Forest, CA (US)

(72) Inventors: Edwin Choo Yong Liang, Singapore (SG); Yaofeng Xu, Suzhou (CN)

(73) Assignee: General Monitors, Inc., Lake Forest, CA (US)

(*) Notice: Subject to any disclaimer, the term of this patent is extended or adjusted under 35 U.S.C. 154(b) by 434 days.

This patent is subject to a terminal disclaimer.

(21) Appl. No.: 15/403,528

(22) Filed: Jan. 11, 2017

(65) Prior Publication Data
US 2017/0205282 A1  Jul. 20, 2017

Related U.S. Application Data

(63) Continuation-in-part of application No. 14/996,808, filed on Jan. 15, 2016, now Pat. No. 9,778,100.

(51) Int. Cl.
*G01J 5/00* (2006.01)
*G01J 1/42* (2006.01)
(Continued)

(52) U.S. Cl.
CPC ........... *G01J 1/4257* (2013.01); *G01J 1/0414* (2013.01); *G08B 17/10* (2013.01); *G01C 9/00* (2013.01)

(58) Field of Classification Search
CPC ........ G01C 9/00; G01J 1/0414; G01J 1/4257; G01J 5/0018; G01J 5/089; G01J 5/0275; G01J 5/047
(Continued)

(56) References Cited

U.S. PATENT DOCUMENTS 6,150,943 A 11/2000 Lehman et al.
8,201,973 B2 * 6/2012 Kudoh ................... G08B 29/08
362/253
(Continued)

FOREIGN PATENT DOCUMENTS

DE 102004035027 2/2006
JP 2005077279 3/2005

OTHER PUBLICATIONS

International Search Report and Written Opinion of the International Searching Authority for International Application PCT/US2017/013432, dated Apr. 11, 2017.
(Continued)

*Primary Examiner* — Que Tan Le
(74) *Attorney, Agent, or Firm* — Larry K. Roberts

(57) ABSTRACT

An embodiment of a flame detector coverage verification system includes an optical source for generating a light beam, and a light-path control unit connected to the optical source and configured to direct the beam through a range of movements about a center line direction of the flame detector to visually demarcate an area that falls within the flame detector's field of view. An indicator device configured to visually indicate a pan direction of the detector optical center line. A tilt indicator is configured to determine and visually display the tilt angle of the detector with respect to a ground plane. A hub structure temporarily attaches the control unit to the flame detector, the control unit pivotally connected to the hub structure so that the optical source light beam is oriented perpendicular to a ground plane.

20 Claims, 29 Drawing Sheets

(51) Int. Cl.
  *G08B 17/10*    (2006.01)
  *G01J 1/04*     (2006.01)
  *G01C 9/00*     (2006.01)

(58) Field of Classification Search
  USPC .................................................. 250/205, 554
  See application file for complete search history.

(56) References Cited

U.S. PATENT DOCUMENTS

2010/0073926 A1   3/2010   Kudoh et al.
2015/0371514 A1   12/2015  Bonisch et al.

OTHER PUBLICATIONS

Instructions, "Cone of Vision Tester for X-series Flame Detectors," Q1201C Laser Holder and Laser, Det-Tronics, with a copyright notice of 2006, by Detector Electronics Corporation, four pages.
Assembly Diagram, Spectrex Inc., "IR3 Flame Detector Assy With Laser Aimer," Detector 40/401-XXXX, Laser Aimer P/N: 777166, with dates Jun. 2, 2009 and Dec. 14, 2010 (one page).
Diagram, Spectrex Inc., "Laser Aimer Assy," OL-777166, dated Jun. 2, 2009.

* cited by examiner

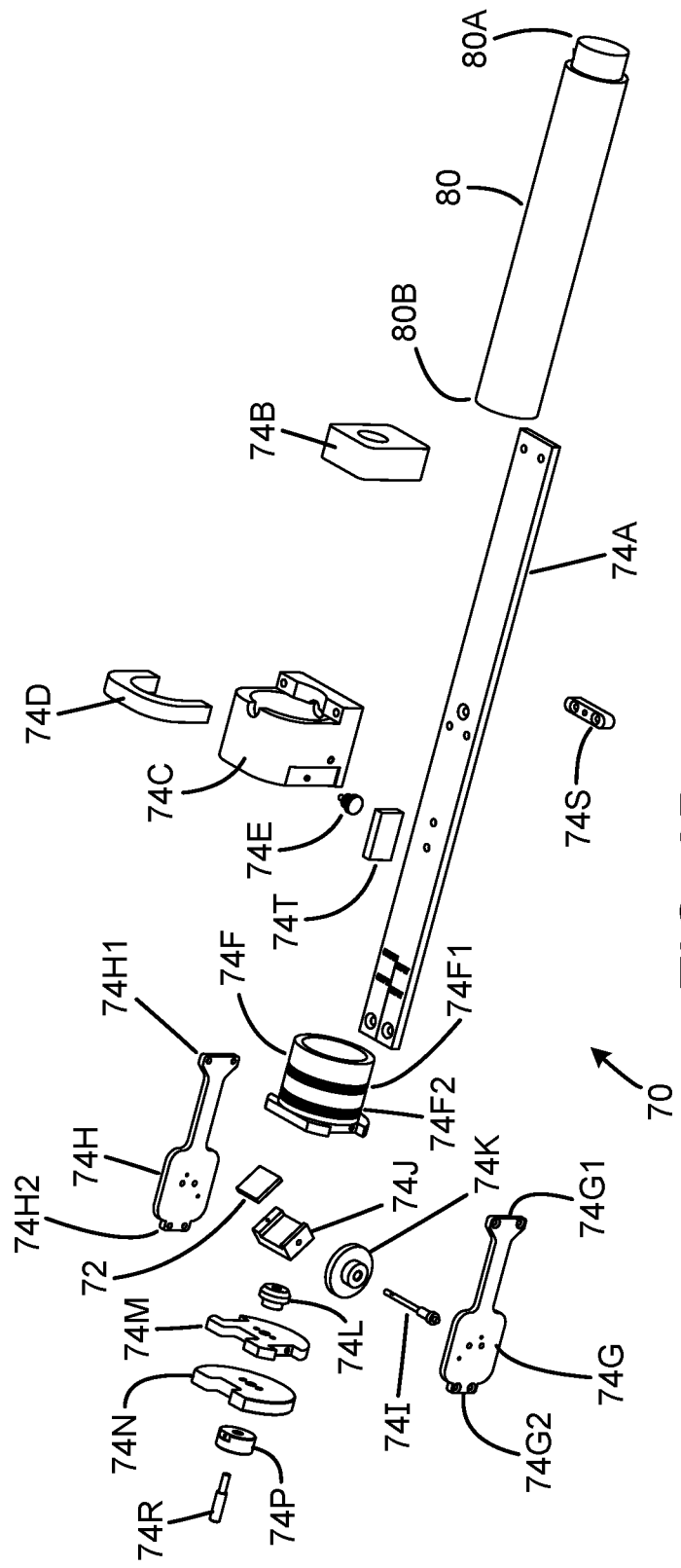

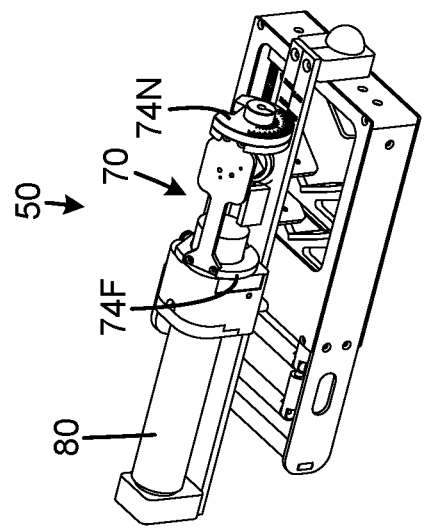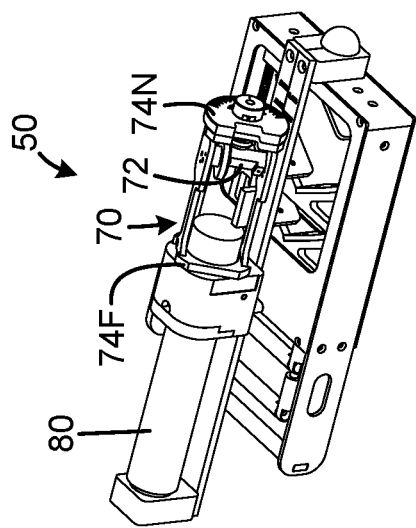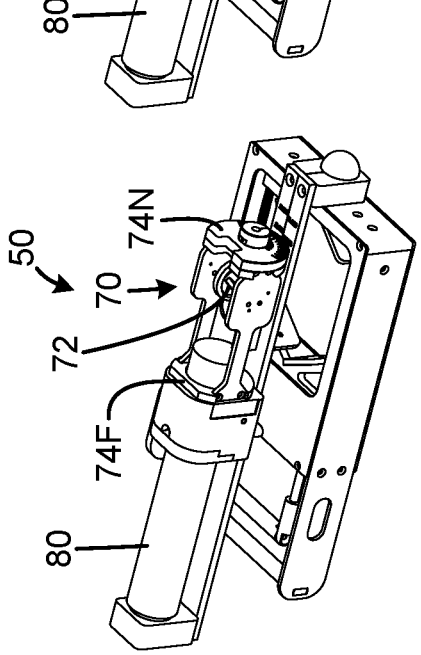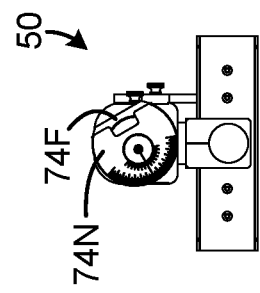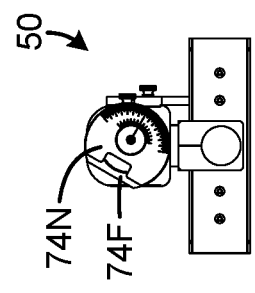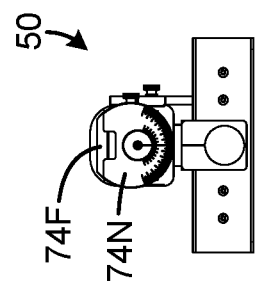

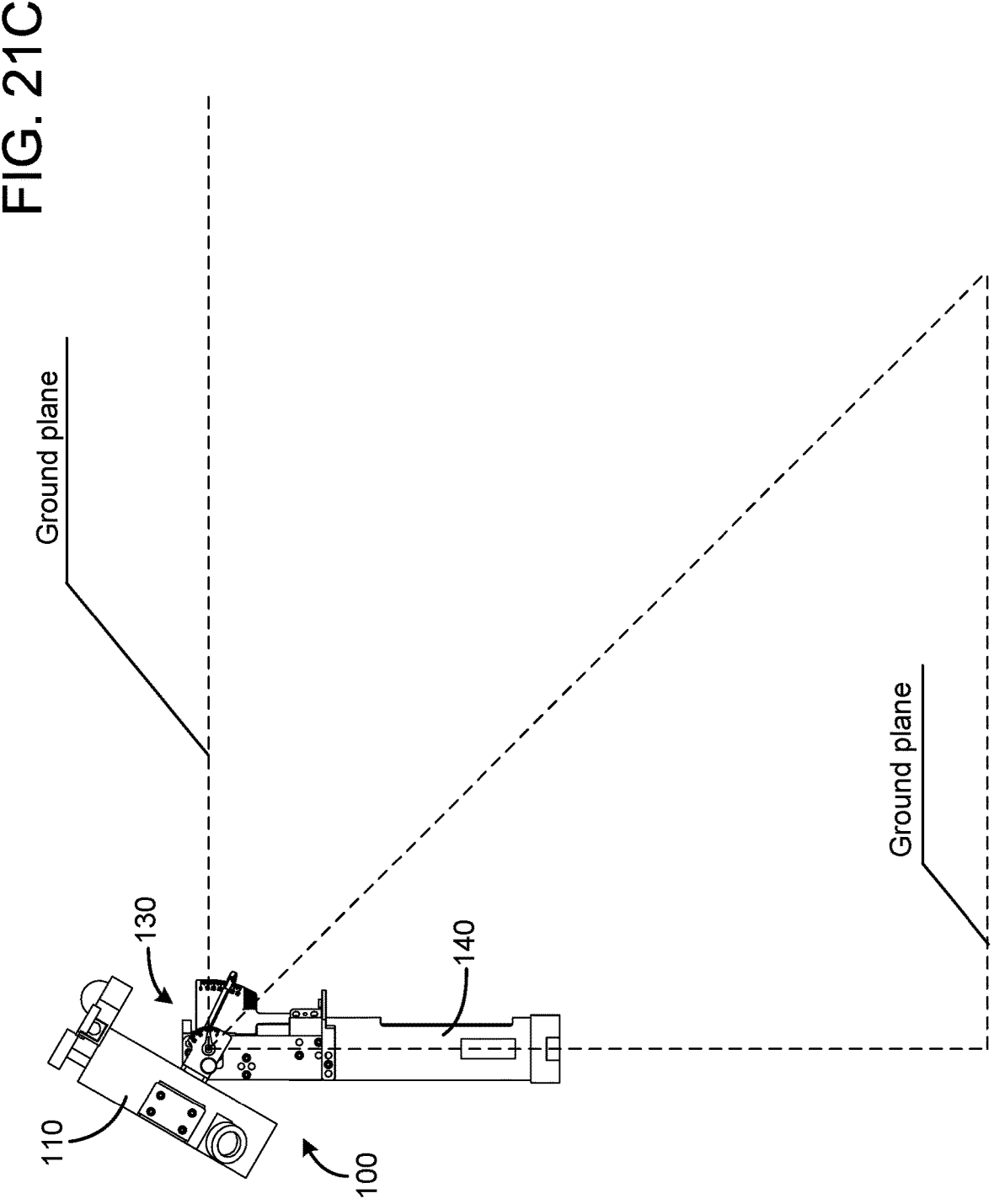

FLAME DETECTOR COVERAGE VERIFICATION SYSTEM FOR FLAME DETECTORS AND HAVING A HUB STRUCTURE FOR TEMPORARY ATTACHMENT TO THE DETECTORS

CROSS-REFERENCE TO RELATED APPLICATION

This application claims the benefit of U.S. application Ser. No. 14/996,808, filed Jan. 15, 2016, the entire contents of which are hereby incorporated by reference.

BACKGROUND

Flame detectors are in use in many environments, typically hazardous locations such as refineries, chemical plants, compressor stations, and fuel loading facilities. Flame detectors typically have an optical field of view, within which the detector has sensitivity to detect flames within range of the detector. The individual flame detectors are typically connected together to form a network of flame detectors configured to cover a larger area, as part of a detection system which in turn may be part of a fire suppression and/or alarm system. Flame detector coverage is critical because it determines the effectiveness of the system to fight a fire and to warn of the danger.

When a flame detector is unable to see an incipient fire, either because its optical field of view is blocked by an obstruction bigger than the fire, or because the incipient fire is at the periphery of the detector's optical field of view (where the detector's sensitivity is typically at its lowest), the flame detection system will not react with the planned fire mitigation action. In this case, the flame detection system is deemed less effective due to poor detection coverage.

The flame detection system may eventually react at a later stage when the incipient fire has grown in size and falls more into the detector optical field of view. But such a delay in response is typically undesired because the consequence of a larger fire is usually much greater. It is usually highly desired, that any fire breakout be detected as early as possible so that fire mitigation action can be triggered at an earlier stage, so that the fire is extinguished before it has the time to grow larger in size.

SUMMARY

An exemplary embodiment of a flame detector coverage verification system includes an optical source for generating a light beam, and a light-path control unit coupled to the optical source and configured to direct the beam in a direction generally co-aligned with a center line of the flame detector and through a range of movement about the direction to visually demarcate an area that falls within the flame detector's field of view. A frame base system temporarily mounts the optical source and the control unit to an installed flame detector. In one embodiment, the control unit is configured to move the optical light source in a pan and tilt direction to achieve the desired range of movement of the light beam. In another embodiment, the control unit includes a mirror for reflecting the light beam and a mirror actuator mechanism configured to position the mirror to reflect the light beam through the range of movement.

Another embodiment of a flame detector coverage verification system includes an optical source for generating a light beam, and a light-path control unit connected to the optical source and configured to direct the beam through a range of movements about a center line direction of the flame detector to visually demarcate an area that falls within the flame detector's field of view. An indicator device visually indicates a pan direction of the detector optical center line. A tilt indicator is configured to determine and visually display the tilt angle of the detector with respect to a ground plane. A hub structure temporarily attaches the control unit to the flame detector, the control unit pivotally connected to the hub structure so that the optical source light beam is oriented perpendicular to a ground plane.

BRIEF DESCRIPTION OF THE DRAWINGS

Features and advantages of the disclosure will readily be appreciated by persons skilled in the art from the following detailed description when read in conjunction with the drawing wherein:

FIG. 8B is an exploded view of the light-path control unit of FIG. 8A.

FIGS. 12A-12F illustrate the light-path control unit of FIG. 4 at exemplary positions to achieve a light path on the center line, and at respective horizontal angles $+\alpha°$ and $-\alpha°$.

FIG. 21C depicts the system at a declination angle and showing the vertical orientation of the laser module.

DETAILED DESCRIPTION

Figure 1:
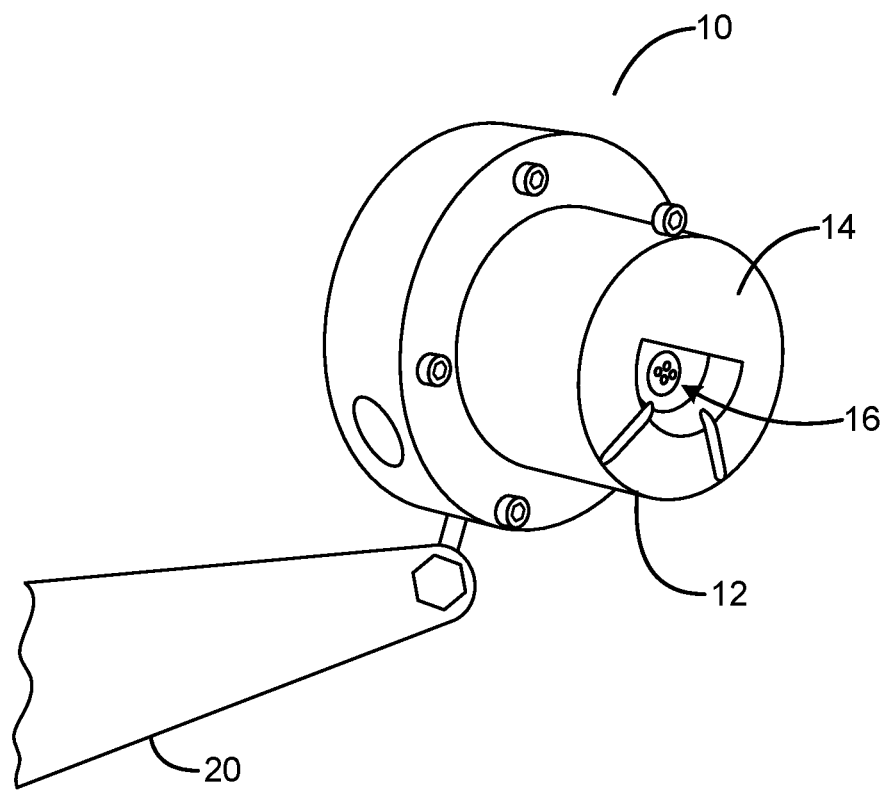
FIG. 1 is a diagrammatic isometric view illustrating a flame detector mounted on a bracket.
Figure 1A:
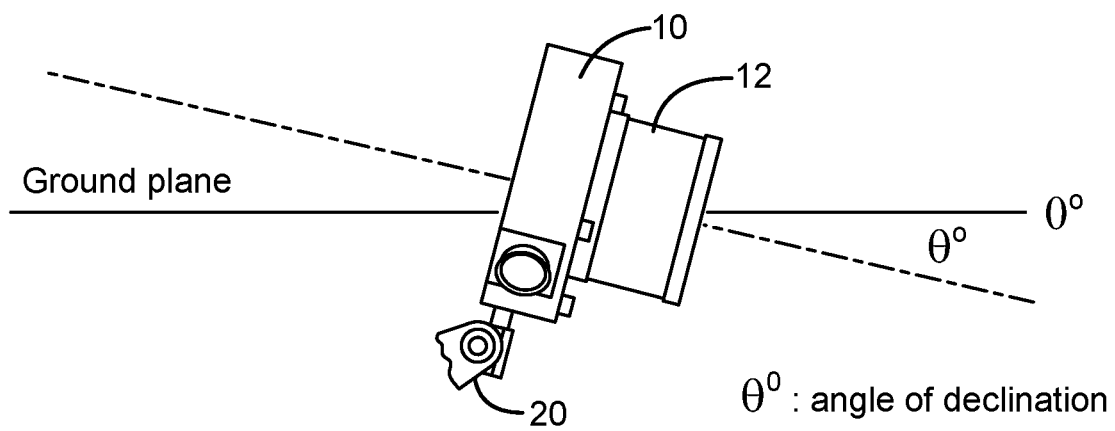
FIG. 1A illustrates a declination coordinate of the flame detector relative to the ground plane.

In the following detailed description and in the several figures of the drawing, like elements are identified with like reference numerals. The figures may not be to scale, and relative feature sizes may be exaggerated for illustrative purposes.

In accordance with aspects of the invention, exemplary embodiments of a flame detector coverage verification device are disclosed. The coverage verification device may be a simple mechanical device for attachment onto installed flame detectors. The attachment of an exemplary device is temporary; the device is attached only during detector orientation and aligning. The device will typically be removed after the detector is fixed into correct orientation and alignment. Preferably the coverage verification device is configured to fit multiple models/sizes of flame detectors. Embodiments of the device are lightweight, and easily attachable to a flame detector body, preferably by clamping-on without the need for fixation screws. If fixation screws are used to lock the device into a position, the tightening of these screws preferably does not require any hand tools such as screw-drivers or Allen-keys.

An exemplary flame detector 10 is illustrated in FIG. 1, mounted to a bracket 20, which in turn is mounted to a structure such as a wall, column or other fixed structure. The flame detector shown in FIG. 1 has a generally cylindrical housing 12, with a front face 14 through which the active sensor elements 16 are exposed to the field of view of the detector. The flame detector may, for example only, be one of the flame detector models marketed under the General Monitors brand, such as the FL5000, FL3101, FL3100 detector models.

Figure 2:
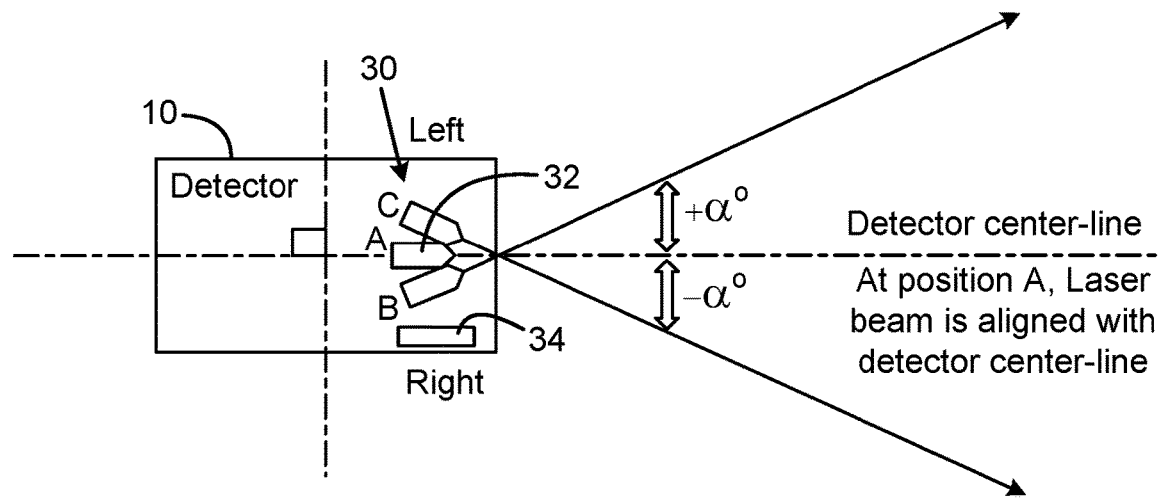
FIG. 2 is a diagrammatic view illustrating an exemplary flame detector coverage system using a laser indicator, showing the laser oriented at extreme azimuth field-of-view coordinates as well as at detector centerline.
Figure 3:
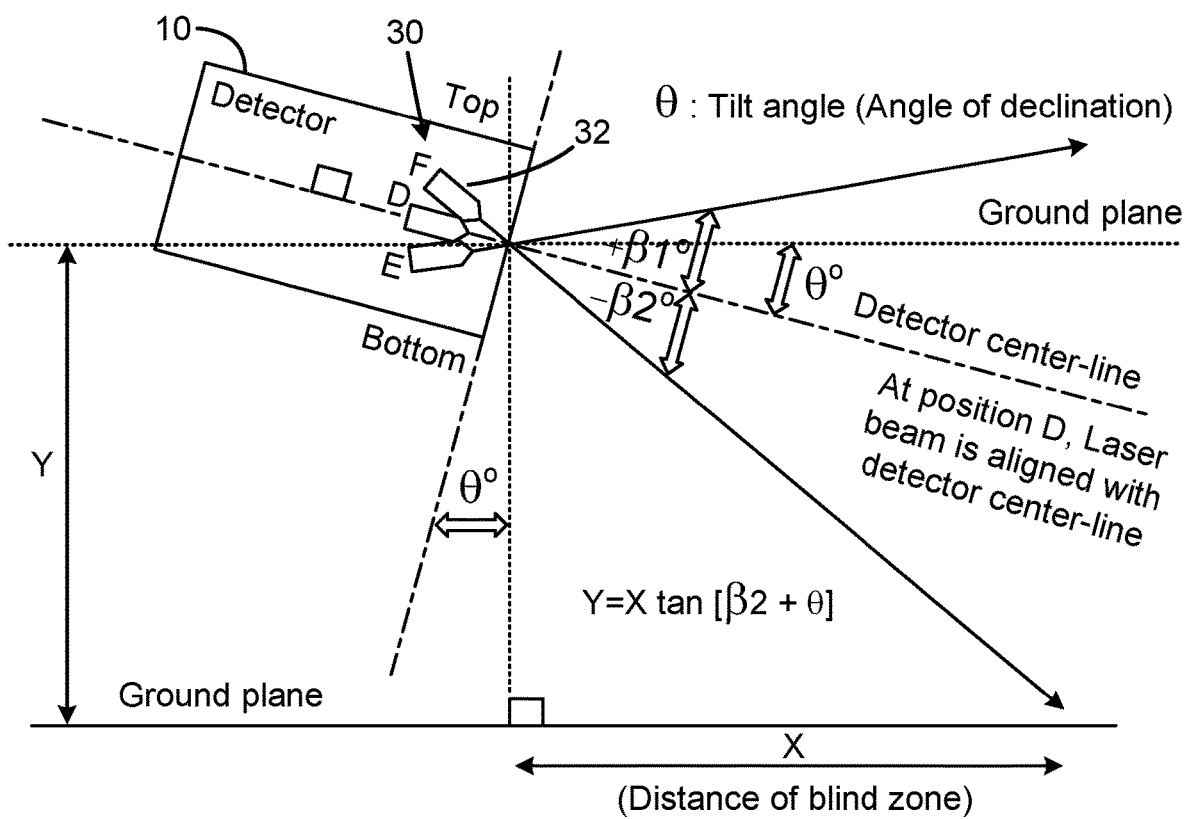
FIG. 3 is a diagrammatic view illustrating the system of FIG. 2, and showing representative angular positions of the laser and laser beam at tilt angles of declination relative to the ground plane.

Embodiments of the flame detector coverage verification device include a laser pointer (optical light source) and a laser light-path control unit. Referring to FIGS. 2 and 3, the device 30 includes the laser pointer 32 and light-path control unit diagrammatically indicated as 34. The control unit allows the laser beam direction to be co-aligned (parallel) to the detector center-line (laser pointer at position A on FIG. 2). For some flame detectors, the optical center line is coincident with the center line of the flame detector housing. For other flame detectors, the detector optical center line may be offset from the center line of the housing. From this position of alignment, the control unit is configured to sweep the laser beam in a pan direction to point to the left (−) in azimuth, or to the right (+), rotating around an axis that is perpendicular to the detector center-line, until the beam direction angle reaches a maximum $\alpha°$.

In this exemplary embodiment, the control unit 34 is a device holding the laser and moving the laser to achieve the beam sweep. In another embodiment described below, the control unit includes a movable mirror to reflect the laser beam to achieve the desired beam coverage.

As shown in FIG. 2, $+\alpha°$ is the maximum angle to the left of the detector center-line (laser pointer at position B in FIG. 2) and $-\alpha°$ is the maximum angle to the right of the detector center-line (laser pointer at position C in FIG. 2). The value of $+\alpha°$ and $-\alpha°$ depend on the detector type and the detector sensitivity setting, and is typically at equal angles.

In an exemplary embodiment, the control unit is configured to lock the laser beam direction at the respective positions at $+\alpha°$ and $-\alpha°$. The laser beam directions at these angles, demarcate the leftmost and rightmost boundaries of the conical field of view at its widest angle away from the detector center-line.

Likewise, from the position of alignment with the detector center line, which center line may have a declination angle $\theta°$ to the ground plane, the light-path control unit is configured to sweep the laser beam in a tilt direction to point above (+) the detector center-line, i.e. in elevation, or to point below (−) the detector center-line, rotating around an axis that is perpendicular to the detector center-line and parallel with the ground plane, until the angle between the beam direction and the detector center-line reaches a maximum angle, $\beta°$.

In an exemplary embodiment, $+\beta1°$ is the maximum angle above the detector center-line (laser at position E on FIG. 3) and $-\beta2°$ is the maximum angle below the detector center-line (laser at position F on FIG. 3). The values of $\beta1°$ and $\beta2°$ typically depend on the detector type and the detector sensitivity setting, and may not necessary be the same.

In an exemplary embodiment, the laser light-path control unit 34 is configured to lock the laser beam direction at the respective $+\beta1°$ and $-\beta2°$ beam directions. The laser beam directions at these angles demarcate the uppermost and lowermost boundaries of the conical field of view at its widest angle away from the detector center-line.

In an exemplary embodiment, the device may have angle markings on it so that it is possible for the field commissioning engineer to easily note the angles $+\alpha°$, $-\alpha°$, $+\beta1°$ and $-\beta2°$ with the flame detector locked into position.

In an exemplary embodiment, the power output of the laser pointer is preferably sufficient to illuminate a point on a physical surface at least 50 feet (15.2 meters) away from the detector. The spots marked by the laser point are preferably clearly visible under bright sun-light. Green and red colored lasers may be utilized under various light conditions.

In accordance with a further aspect, in an exemplary embodiment, the laser is preferably intrinsically safe and suitable for use in a classified Class 1 Division 2 or Zone 2 hazardous environment. This will allow the device to be used in an operating industrial environment. Exemplary laser pointers which comply with the intrinsically safe classification are commercially available.

In accordance with a further aspect, the device 30 includes a compass to indicate the angular orientation of the device relative to magnetic North, and a declination indicator to determine the angle of declination $\theta°$ referenced to the ground plane. The device may have angle markings on it so that it is possible for the field commissioning engineer to easily adjust and lock the detector tilt angle to a desired angle of declination θ°.

At a given detector mounting height (Y height in FIG. 3), the angle of declination θ° can be used to manually calculate the 'blind zone distance' (X distance in FIG. 3) below the conical FOV of the detector.

The angle of declination θ° can also be applied into flame mapping software to determine the detection coverage area at various tilt angles and detector mounting heights.

Figure 4:
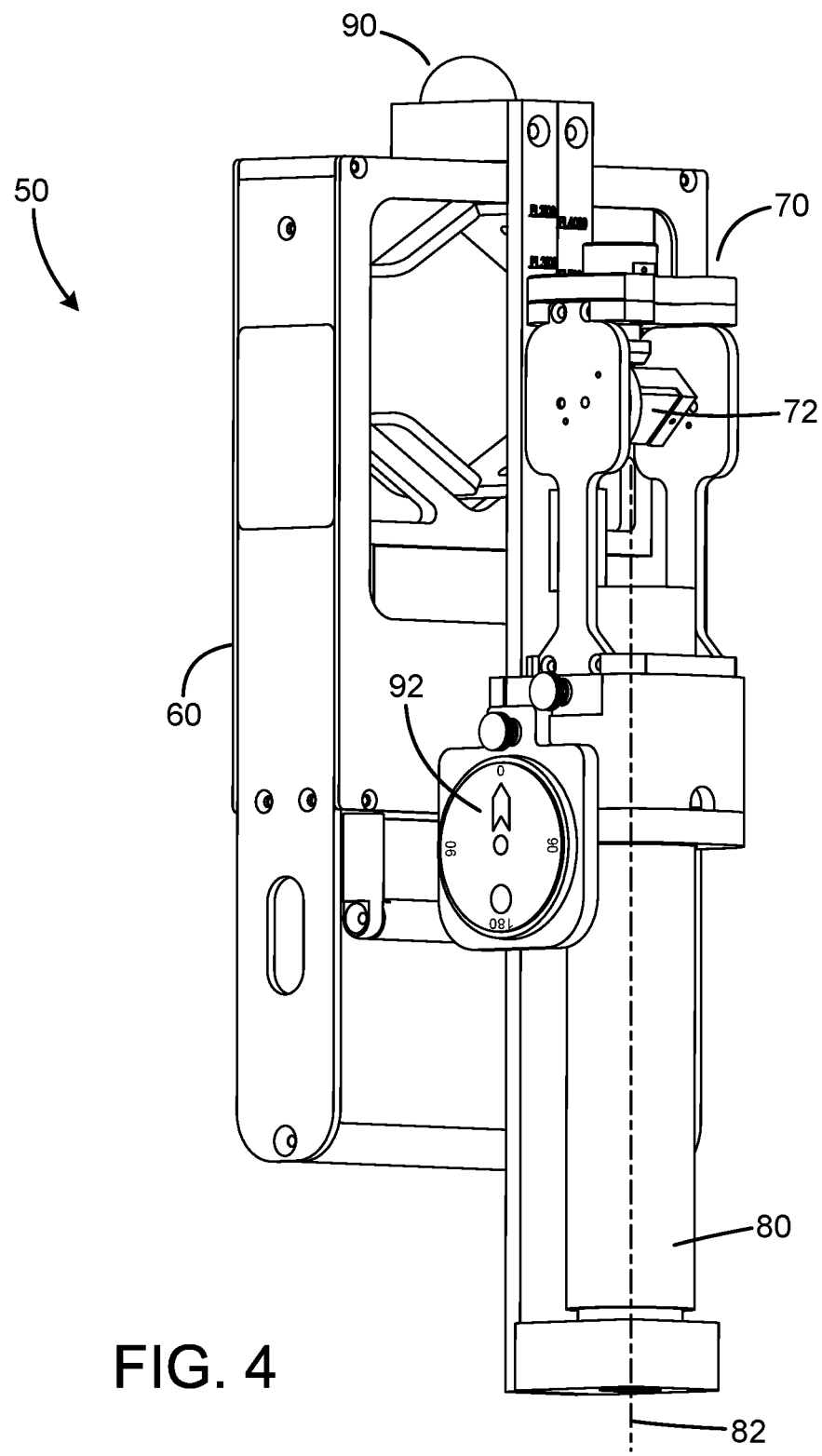
FIG. 4 is a frontal isometric view of another exemplary embodiment of a flame detector coverage verification system.

Another exemplary embodiment of a flame detector coverage verification device 50 is illustrated in FIGS. 4-12F. The device includes a frame base system 60, a light beam-path control unit 70, a light source 80, a compass 90 and a declination indicator 92. In this example, the light source 80 is an intrinsically safe laser module for directing a laser beam upwardly along light source axis 82 (FIG. 4). The control unit 70 includes a mirror 72 mounted for movement about a horizontal axis and an axis perpendicular to the horizontal axis, and configured to deflect the light beam along directions angles +α°, −α°, +β1° and −β2°, as will be described in further detail below.

Figure 4A:
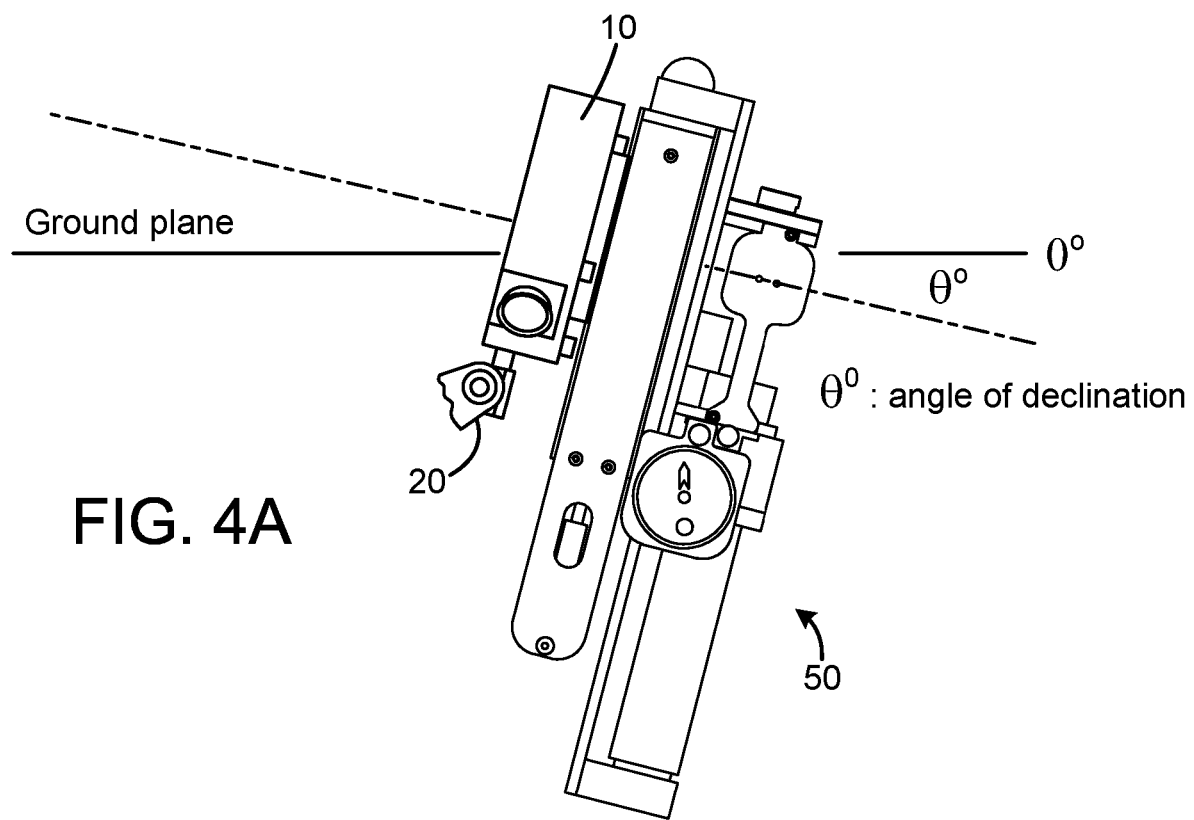
FIG. 4A is a side view illustrating the verification system in place on a flame detector.

FIG. 4A depicts the verification device in place on an exemplary flame detector.

Figure 5:
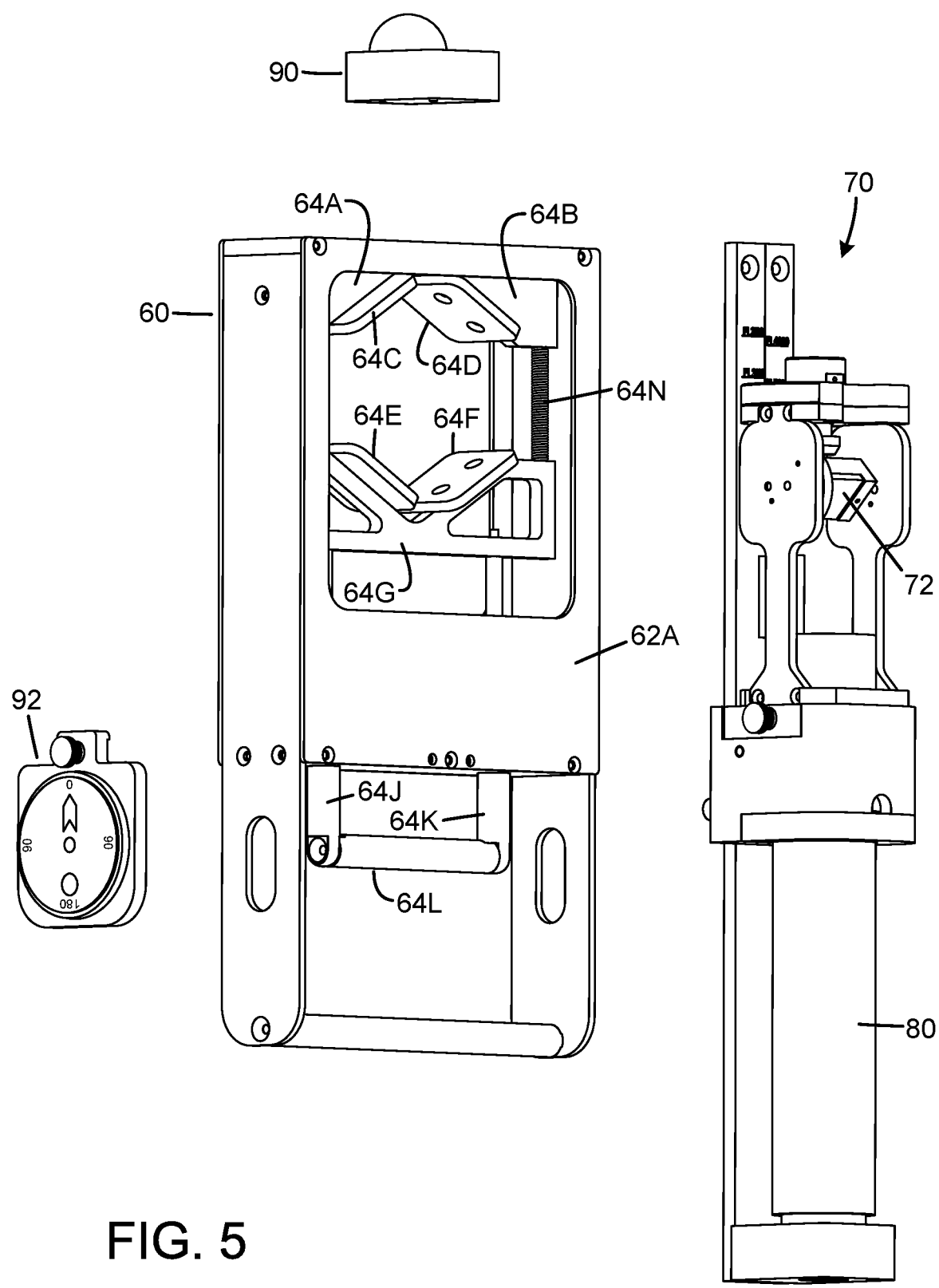
FIG. 5 is an exploded isometric view of the system of FIG. 4.
Figure 7A:
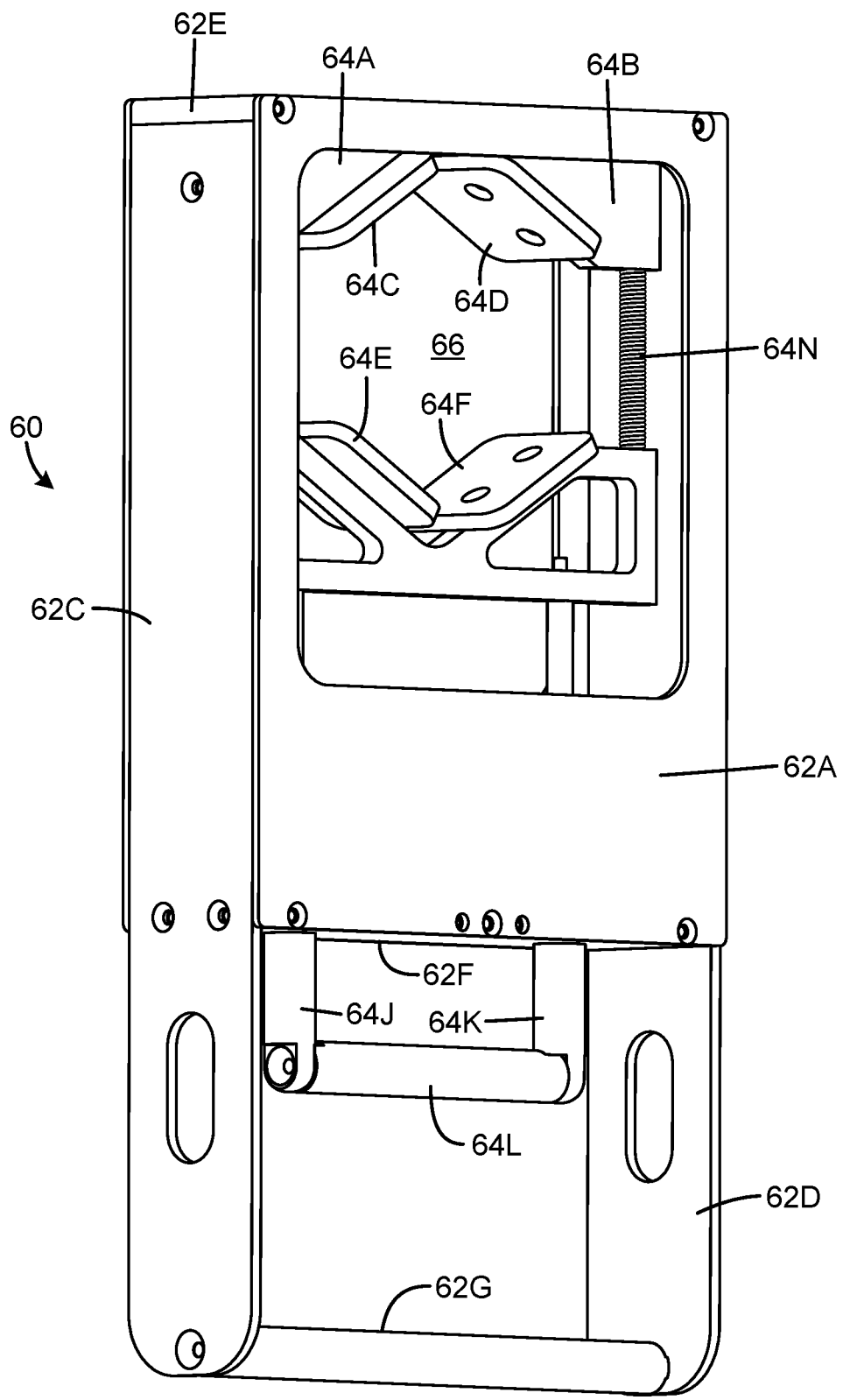
FIG. 7A is an isometric view of the frame base of the exemplary embodiment of FIG. 4.
Figure 7B:
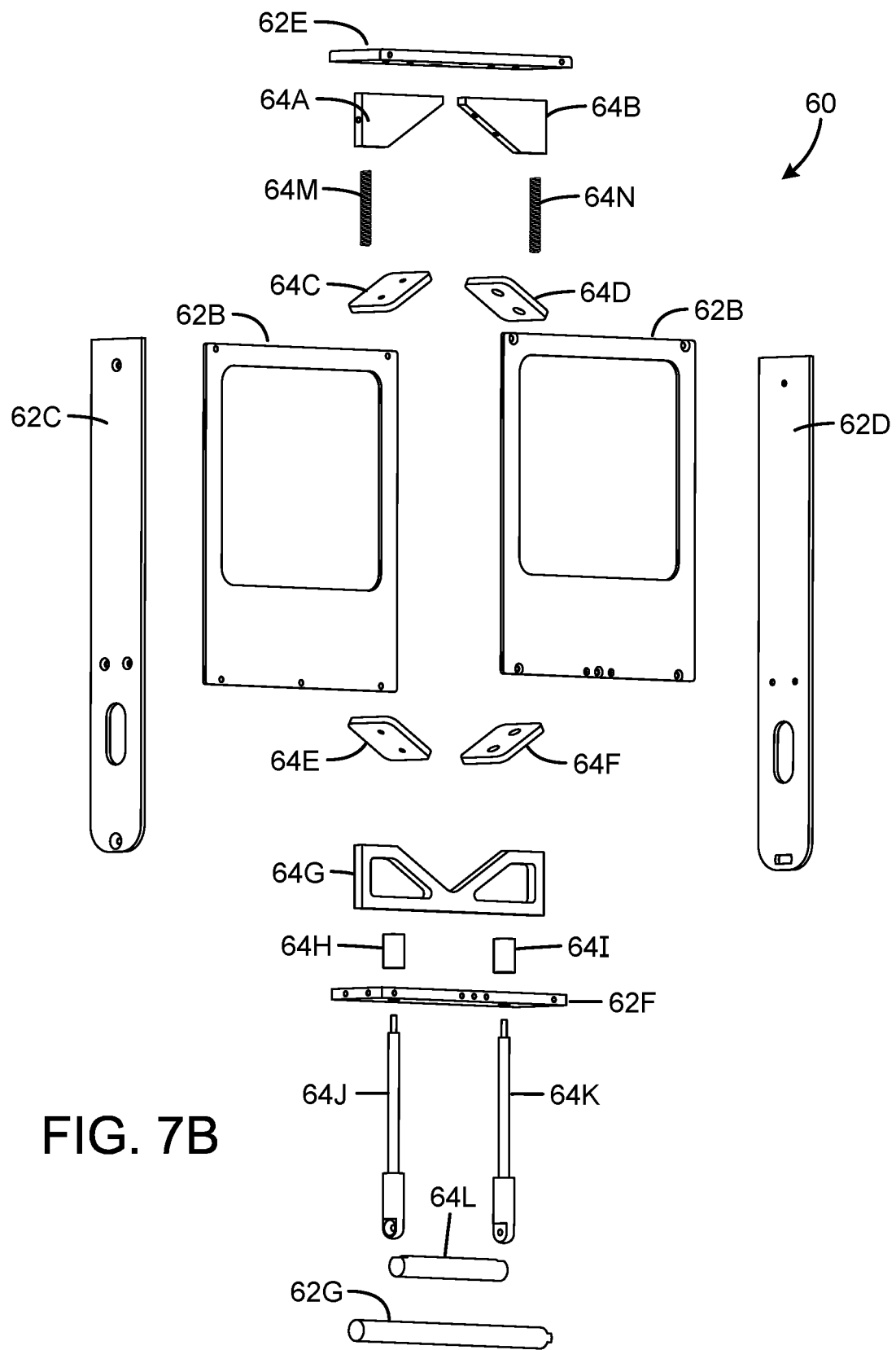
FIG. 7B is an exploded view of the frame base of FIG. 7A.

The frame base system 60, shown in further detail in FIGS. 5 and 7A-7B, includes a frame base comprising left, right, top and bottom frame structures 62C, 62D, 62E, 62F and front and back covers 62A, 62B. These parts may be fabricated of a lightweight rigid material, such as aluminum, and fastened together with threaded fasteners, for example. Attached to the lower surface of the top plate 62E are left and right corner supports 64A, 64B, with respective attached elastomeric upper clamp pads 64C, 64D. The clamp pads 64C, 64D are fixed in position relative to the frame structure. A slidable clamp base 64G has affixed thereto lower elastomeric clamp pads 64E, 64F. The clamp base is attached to ends of slide rods 64J, 64K, which are mounted for sliding movement through sleeves 64H, 64I fixed in openings in the bottom frame plate 62F. A slide handle 64L is attached at the distal ends of the slide rods. A pair of springs 64M, 64N are attached between the corner supports 64A, 64B and upper corners of the clamp base 64G. The springs bias the position of the clamp base 64G to a rest position closest to the corner supports, but allow the slide handle to pull down the clamp base to create an opening generally indicated as 66 (FIG. 7A) to allow the device 50 to be positioned onto an installed flame detector housing. In an exemplary embodiment, the left and right frame structures 62C, 62D have a length on the order of one foot, and the top and bottom frame structures have a length of around six inches, although these dimensions may vary depending on the size of the flame detector (s) for which the device is designed to accommodate.

Figure 6A:
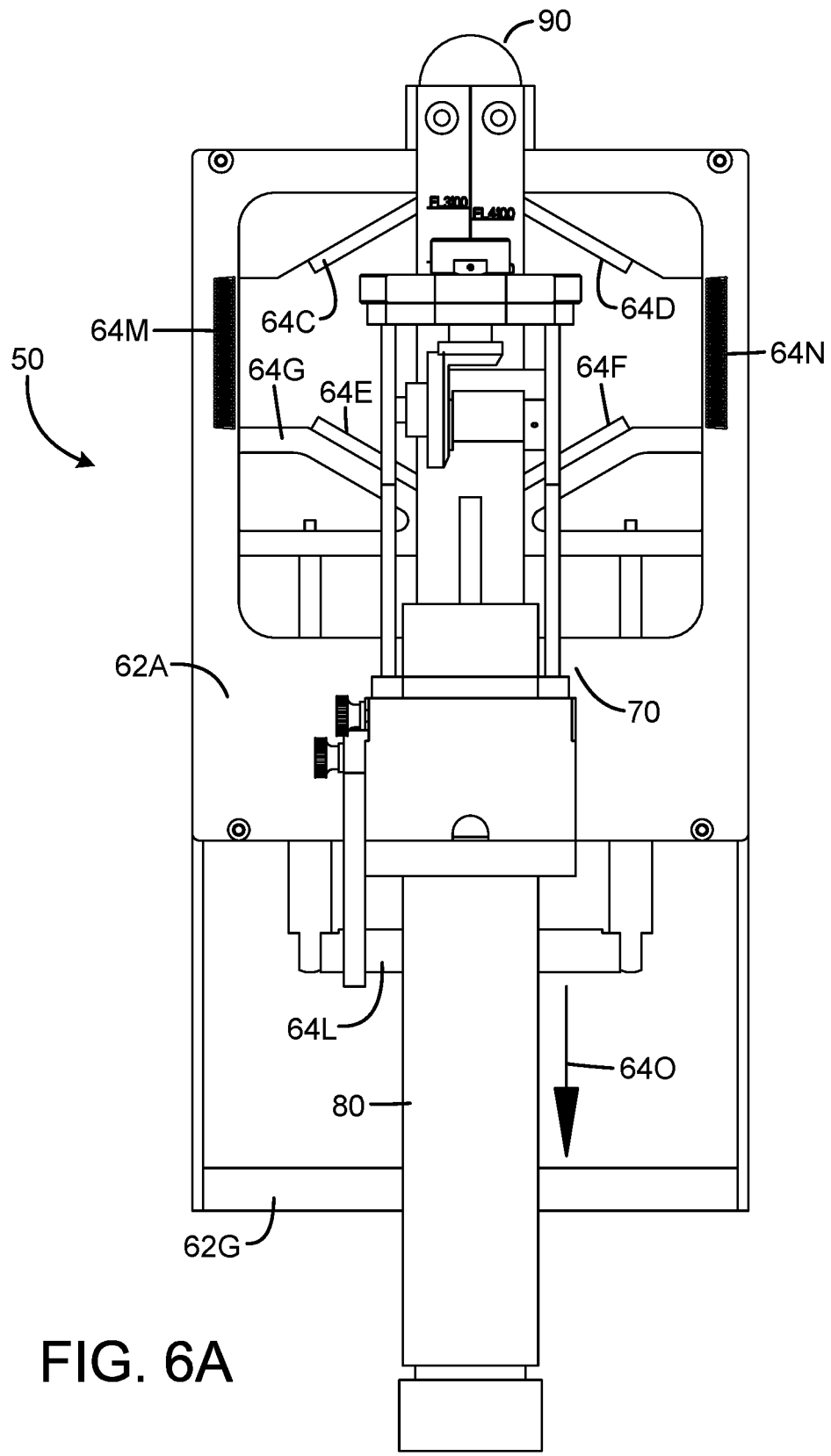
FIG. 6A is a diagrammatic front view of the system of FIG. 4, showing the clamp handle in the rest position.
Figure 6B:
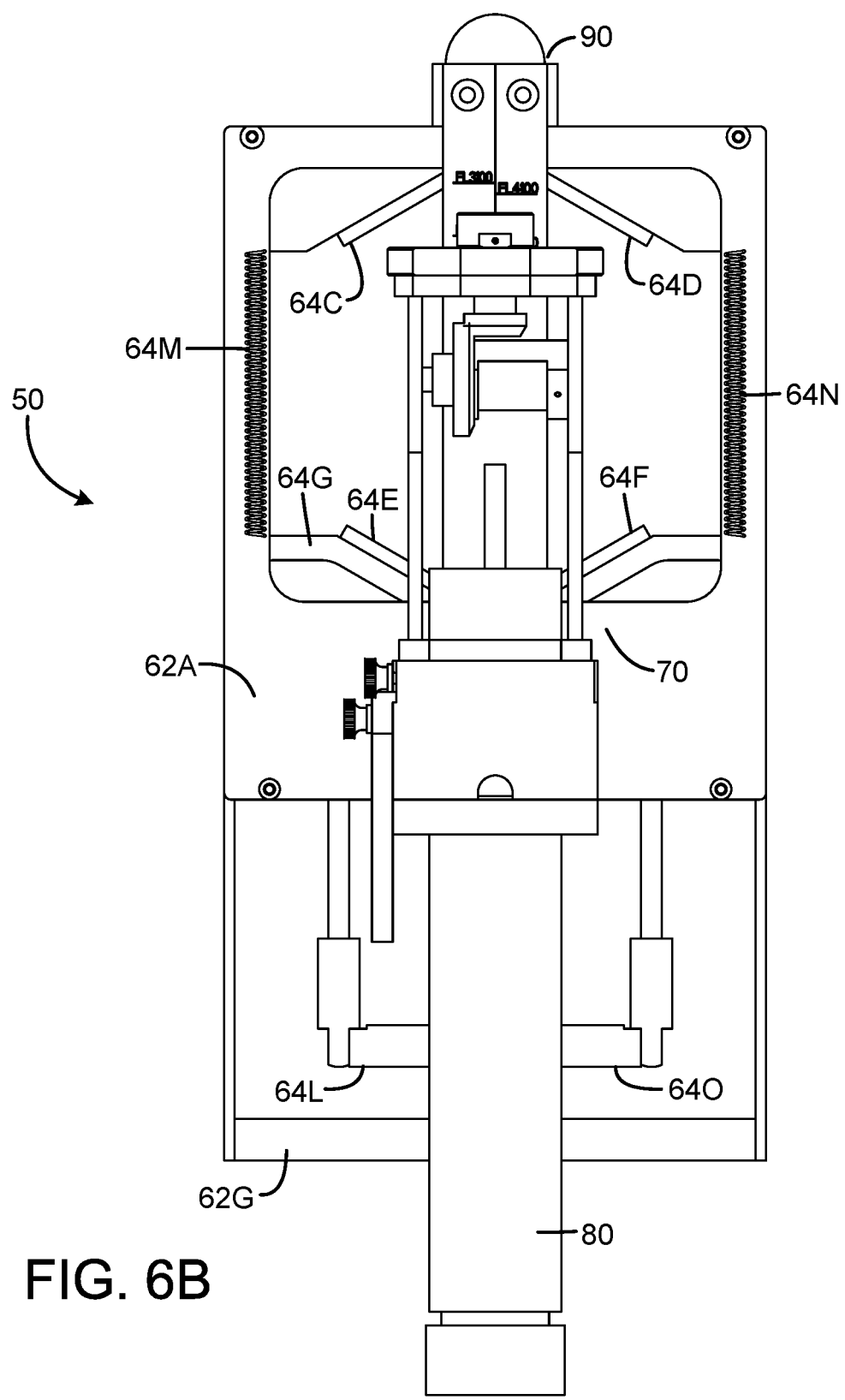
FIG. 6B is a diagrammatic front view similar to FIG. 6A, but showing the clamp handle in the clamp release position.

FIG. 6A shows the clamp base 64G in the rest position, with the springs 64M, 64N diagrammatically shown. To attach the device 50 to the flame detector, the slide handle 64L is pulled down by the field operator in the direction of arrow 64O (FIG. 6A) to open the upper and lower clamp pads sufficiently to allow space for the flame detector housing.

Figure 8A:
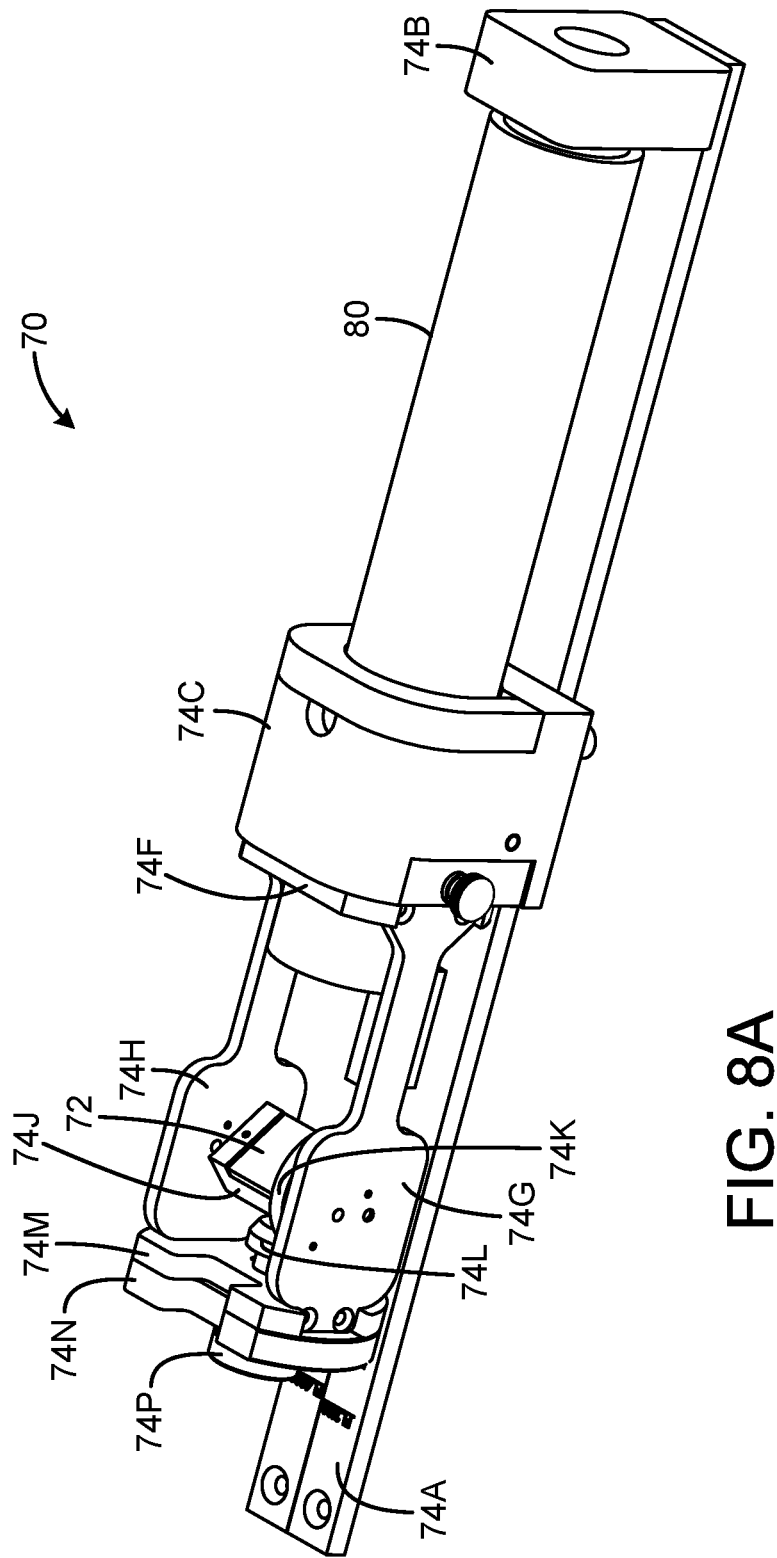
FIG. 8A is an isometric view of the light source path control unit of the system of FIG. 4.

The light-path control unit 70 is secured to the front cover 62A of the frame base system 60 by threaded fasteners, in this exemplary embodiment. FIGS. 8A and 8B illustrate the control unit 70 in further detail. The unit includes a main beam 74A which is secured to the frame base by threaded fasteners. A bottom base 74B is attached to the lower end of the beam, and an upper laser support base 74C is attached to the beam intermediate the ends of the beam. The support base 74B and a support ring 74D (attached to support base 74C) hold the laser module in an aligned position along the beam; the support ring 74D is fitted over the laser module and attached to the support base 74C by threaded fasteners to secure the laser module in place. The support base 74B has a shallow cylindrical opening configured to receive the end 80A of the laser module 80. The support base 74C has a cylindrical opening as well, sized to receive a slidable sleeve 74F. A stopper block 74T is attached to the beam 74A, to provide a stop surface for the end 80B of the laser module 80.

With the laser module secured in alignment to the main beam 74A, the laser module when activated will direct its light beam along the axis 82 (FIG. 4), to mirror 72. The mirror is mounted on a base 74J (FIG. 8B), which in turn is supported on horizontal pin 74I for pivoting movement. The pin is supported on side plates 74G, 74H, first ends (74G1, 74H1) of which are affixed to opposite sides of the rotatable sleeve 74F. The second ends 74G2, 74H2 of the side plates are attached to a top plate 74M. The rotatable sleeve 74F fits into the opening formed in the support base 74C such that the end 80B of the laser module also fits within the sleeve 74F.

A first angle gear 74K is also fitted onto the pin 74I. A second angle gear 74L is mounted on a pin 74R fitted through a bore in the top plate 74M, so that its teeth engage the first angle gear 74L. A vertical rotate knob 74P is fitted onto the pin 74R, and may be rotated by the device user to rotate the mirror 72 about the axis of pin 74I through a range of movement.

A horizontal rotate plate 74N is affixed to the top plate 74M, and may be turned manually by the device operator to rotate the sleeve within the support base 74C, in turn rotating the mirror horizontally through a range of motion.

Figure 6C:
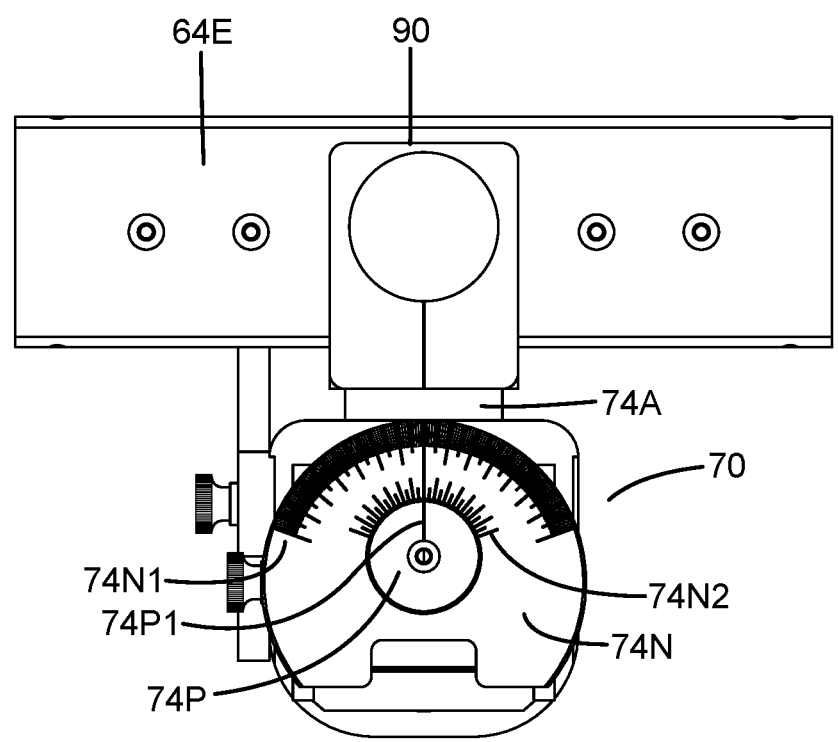
FIG. 6C is a top view of the system of FIG. 4.
Figure 11B:
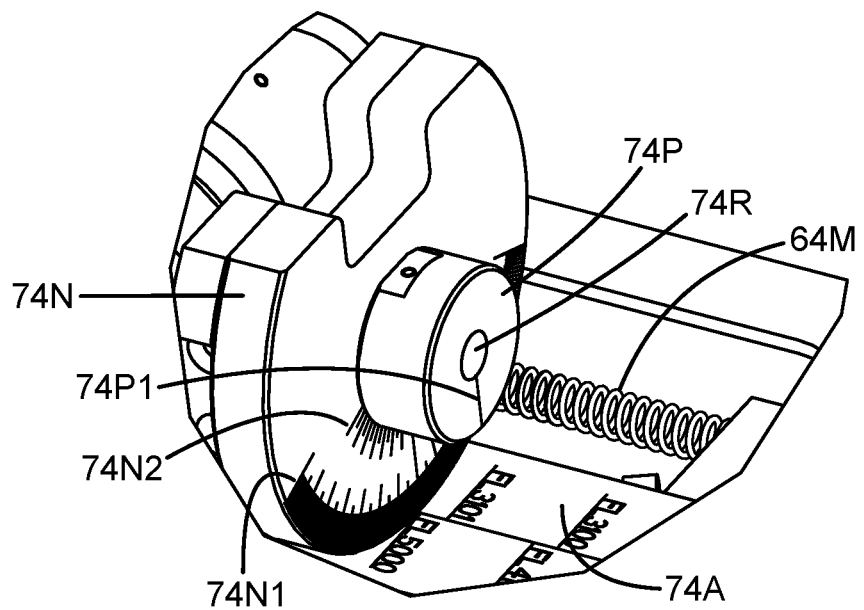
FIGS. 11A-11H illustrate the light-path control unit of the embodiment of FIG. 4 and exemplary positions of the control unit to achieve a light path on the center line, and at vertical declination angles $+\beta 1$ and $-\beta 2$.

The horizontal rotate plate 74N has formed thereon respective inner and outer scales 74N2 and 74N1 (FIGS. 6C, 11B). The scales indicate angular offset from the zero location indicated in FIG. 6C. When the rotate knob 74P is turned by the device operator, the zero mark 74P1 can be aligned to the mark in the scale 74N2 corresponding to the desired offset of the mirror from the vertical center line. Similarly, by turning the rotate plate 74N, the scale 74N1 may be used to indicate the angular offset from the horizontal center line.

As used herein, e.g., with respect to the pins 74I and 74R, the terms "horizontal" and "vertical" are intended as a reference with the beam 74A mounted vertically. In an exemplary use, the device and beam will often be oriented at an angle θ° with respect to the ground plane, so the vertical pin is actually oriented away from the vertical.

Figure 8C:
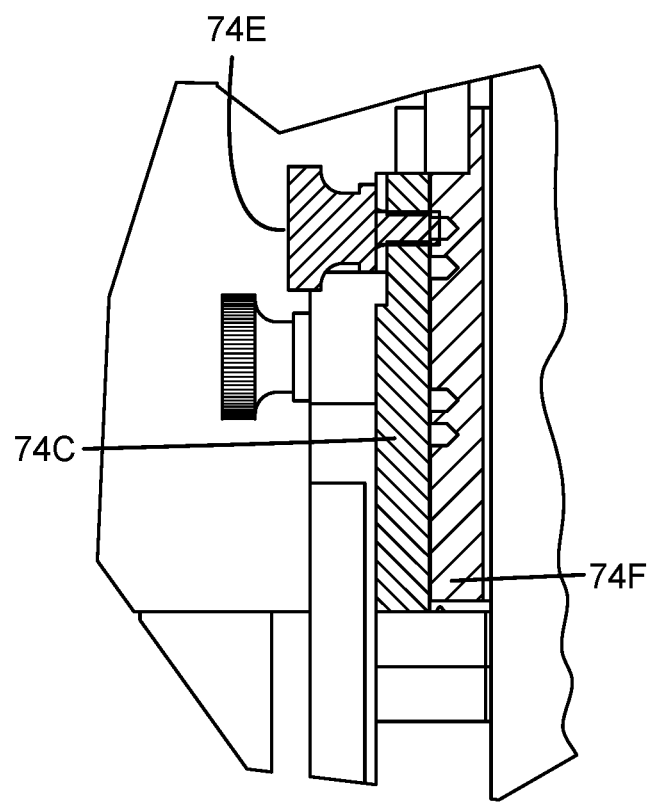
FIG. 8C is a cross-section view illustrating the rotator sleeve and the support block.
Figure 10:
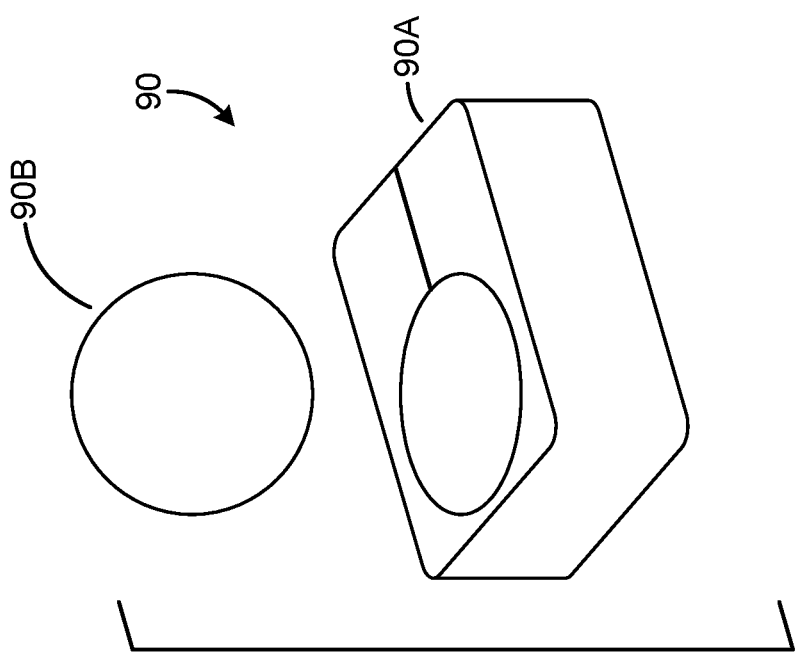
FIG. 10 is an exploded view of an exemplary embodiment of a compass of the system of FIG. 4.

The vertical position of the mirror 72 can be adjusted to accommodate different flame detector configurations or sizes. The vertical position of the rotate sleeve 74F within the support block 74C can be adjusted to one of several preset positions, in this exemplary embodiment. A thumbscrew 74E is threaded into a threaded bore in the side of support block 74C and protrudes into the opening to engage into one of a set of grooves formed in the outer periphery of the rotate sleeve. In FIG. 8B, 74F1 indicates one set of two spaced grooves, and 74F2 indicates another set of two spaced grooves. The tip of the set screw 74E engages into the selected groove to fix the position of the rotate sleeve within support block 74C, as shown in FIG. 8C. The different positions defined by the grooves determine the vertical position of the mirror relative to the beam 74A, since the rotate sleeve carries the mirror 72. These positions correspond to different flame detectors, as indicated in FIG.

11B, such as FL5000, FL3101, FL3100 (flame detector models marketed under the General Monitors brand) and so on.

Figure 11A:
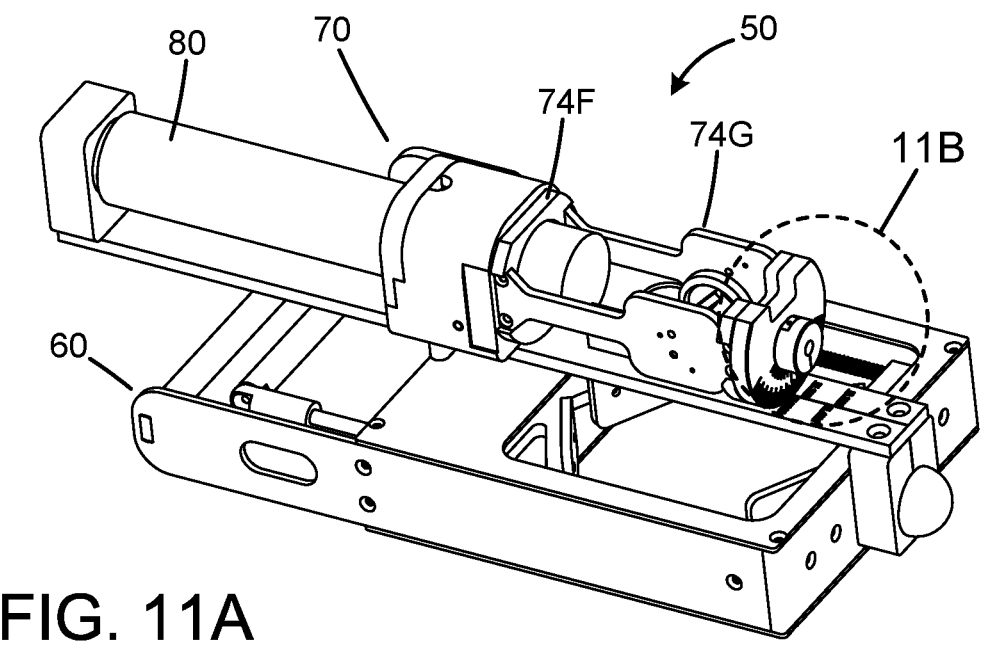

FIGS. 11A and 11B show the device 50 and the light-path control unit in further detail. Rotating knob 74P changes the vertical deflection angle of the mirror 72 (i.e. by rotating the mirror about pin 74I). Rotating the sleeve 74F by turning plate 74N results in changing the horizontal deflection angle of the mirror.

Figure 11H:
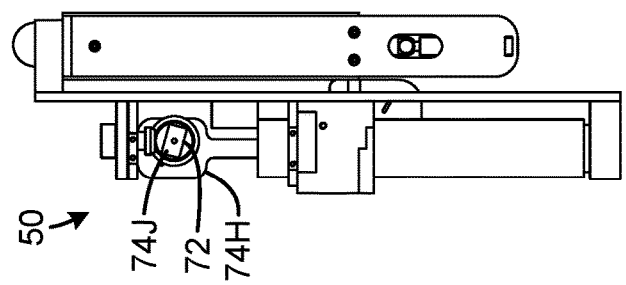
Figure 11E:
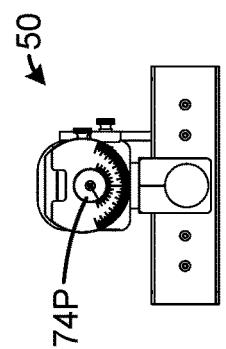
Figure 11G:
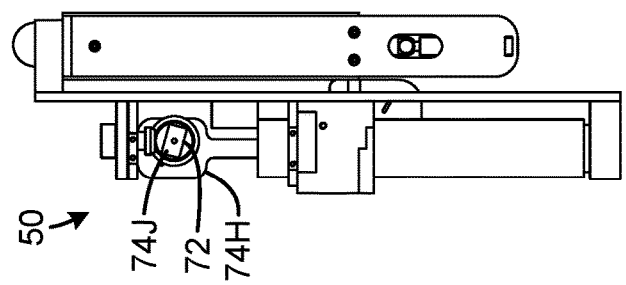
Figure 11D:
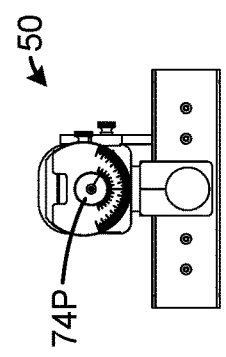
Figure 11F:
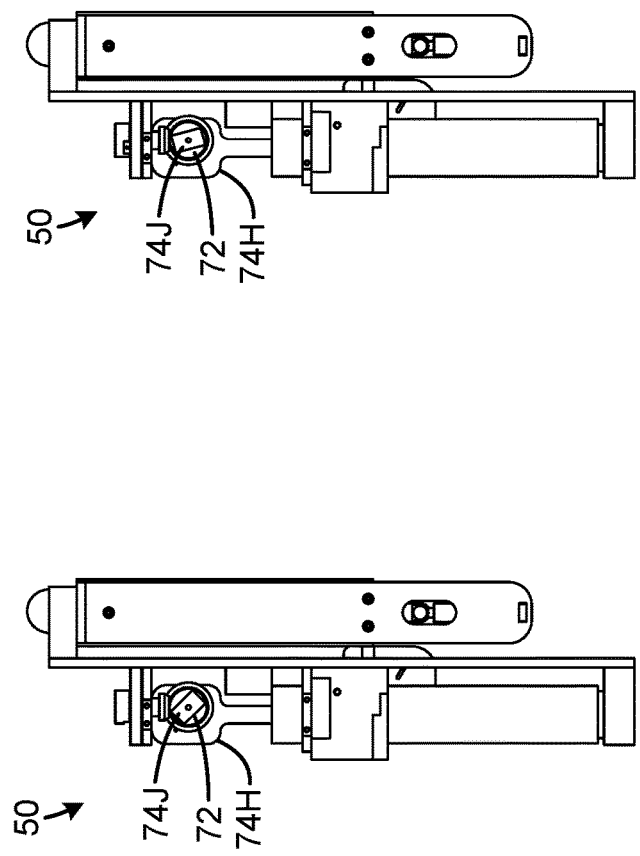
Figure 11C:
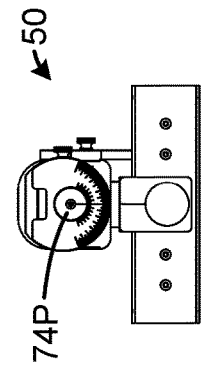

FIGS. 11C-11H illustrate the use of the control unit 70 to position the mirror 72 vertically. FIGS. 11C and 11F are respective top and left side views of the device 50, with the side plate 74H broken away in FIG. 11F to reveal the mirror 72 and support block 74J. In FIGS. 11C and 11F, the control knob is set to the zero line, so that the laser beam light path is directed to the center line. FIGS. 11D and 11G are views similar to FIGS. 11C and 11F, except that the knob 74P is turned in the counterclockwise direction to the position indicated in FIG. 11D, corresponding to light path direction +β1. FIGS. 11E and 11H illustrate the position of the mirror 72 with the knob 74P turned clockwise from the zero position, to a position corresponding to light path direction −β2°.

FIGS. 12A-12F similarly illustrate the use of the control unit 70 to position the mirror 72 horizontally. FIGS. 12A and 12D are top and top left isometric views of the device 50, showing the control unit 70 configured to position the laser light beam at the light-path center line, with the rotate plate 74N positioned at the zero location. FIGS. 12B and 12E are views similar to FIGS. 12A and 12D, but with the rotate plate rotated counterclockwise to position the mirror to deflect the laser beam to light-path position +α°. FIGS. 12C and 12F are views similar to FIGS. 12A and 12D, but with rotate plate rotated clockwise with respect to the zero position to position the laser beam at beam location −α°.

Figure 9:
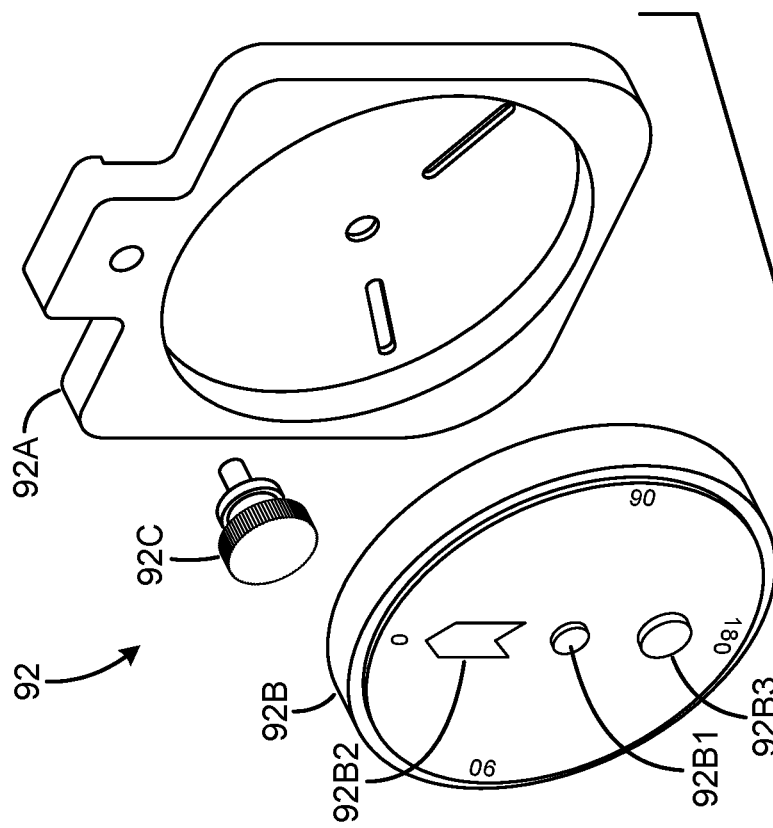
FIG. 9 is an exploded view of an exemplary embodiment of a tilt angle or declination indicator of the system of FIG. 4.

Referring now to FIG. 9, the exemplary device 50 includes a declination indicator 92. The exemplary indicator is a dial device 92B, with a weighted indicator 92B2 mounted for rotation on pin 92B1. A weight 92B3 is attached to the indicator at the end opposite the arrow, and the indicator dial has indicia reflecting angles. The dial device is supported on housing 92A, which is attached to side plate 62C by threaded fastener 92C.

The exemplary device 50 further includes a compass 90 (FIG. 10), which in this example is a liquid-filled compass 90B supported by compass base 90A, secured to the top plate 62E. The compass 90 indicates the direction relative to magnetic North of the device 50.

An alternate embodiment of a flame detector coverage verification system is illustrated in FIGS. 13-21D. The system 100 is shown in FIGS. 13-16 as mounted to a flame detector 10, which in turn is mounted to bracket 20', which in turn typically is mounted to a structure, such as a wall, post or the like at an installation being monitored by the detector 10. As with the embodiment of FIGS. 1-12, the system 100 is configured for temporary attachment to a fielded flame detector. The system includes a cup-like hub structure 110, which supports a compass and level assembly 120, the light path control unit 130, and the laser module 140.

Figure 19:
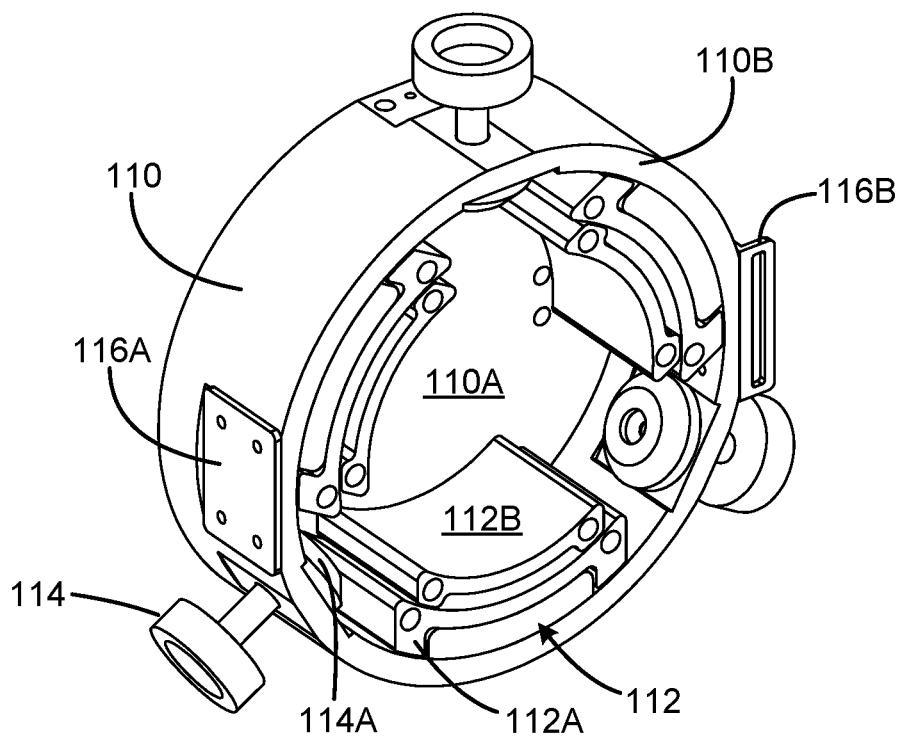
FIG. 19 is an isometric view of the hub structure of the system of FIG. 17.

The hub structure 110 is shown in further detail in FIG. 19, and includes a base plate 110A enclosing cylindrical wall portion 110B. The hub structure in this exemplary embodiment is configured to fit onto the cylindrical portion 12 (FIG. 1) of the flame detector 10. To accommodate different sized detectors, adapters 112 can be secured by threaded fasteners to the base plate 110A, to reduce the interior diameter dimension of the hub structure. In this example, two sets of curved adapter plates 112A, 112B are provided, each having three plates. The adapter sets can be removed to fit a first detector size, adapter set 112A fitted to adapt to a second detector size smaller than the first size, and adapter set 112B fitted to adapt to a third detector size smaller than the second size. Of course, in other embodiments, more or fewer or no adapters may be employed.

The housing structure 110 further includes a fixing system to secure the hub structure to the flame detector temporarily. In this exemplary embodiment, the fixing system includes three spaced thumbscrews 114 each with a rubber pad 114A fitted through threaded bores in the wall portion 110B. Once the device is placed onto the flame detector, with the wall portion and adapter generally centering the system 10 onto the flame detector housing, the thumbscrews may be tightened to further secure and center the system 10 onto the detector housing. To complete the attachment, the fixing system may include a safety strap system, with strap 116 having one end attached to plate 116A (FIG. 19), and the other end fitted though a slotted plate 116 on the opposite size of the wall portion 110B. The strap may have a buckle, or and end with a hook and loop fastening system, to fit over the back of the flame detector 10 and further secure the system 100 in place.

Figure 13:
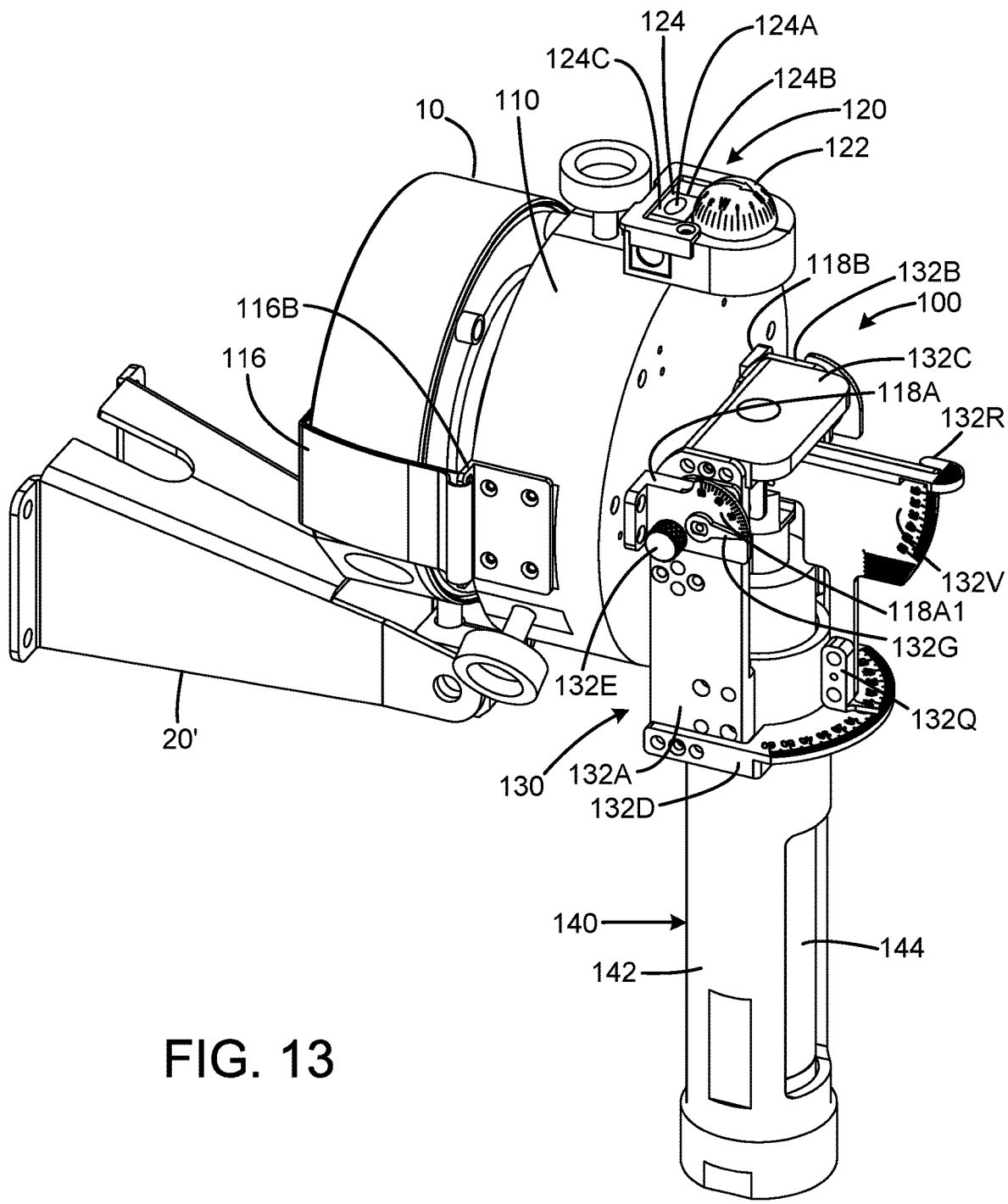
FIG. 13 is a diagrammatic isometric view illustrating a flame detector mounted on a bracket, and with an alternate embodiment of a flame detector coverage verification system mounted to the flame detector.
Figure 14:
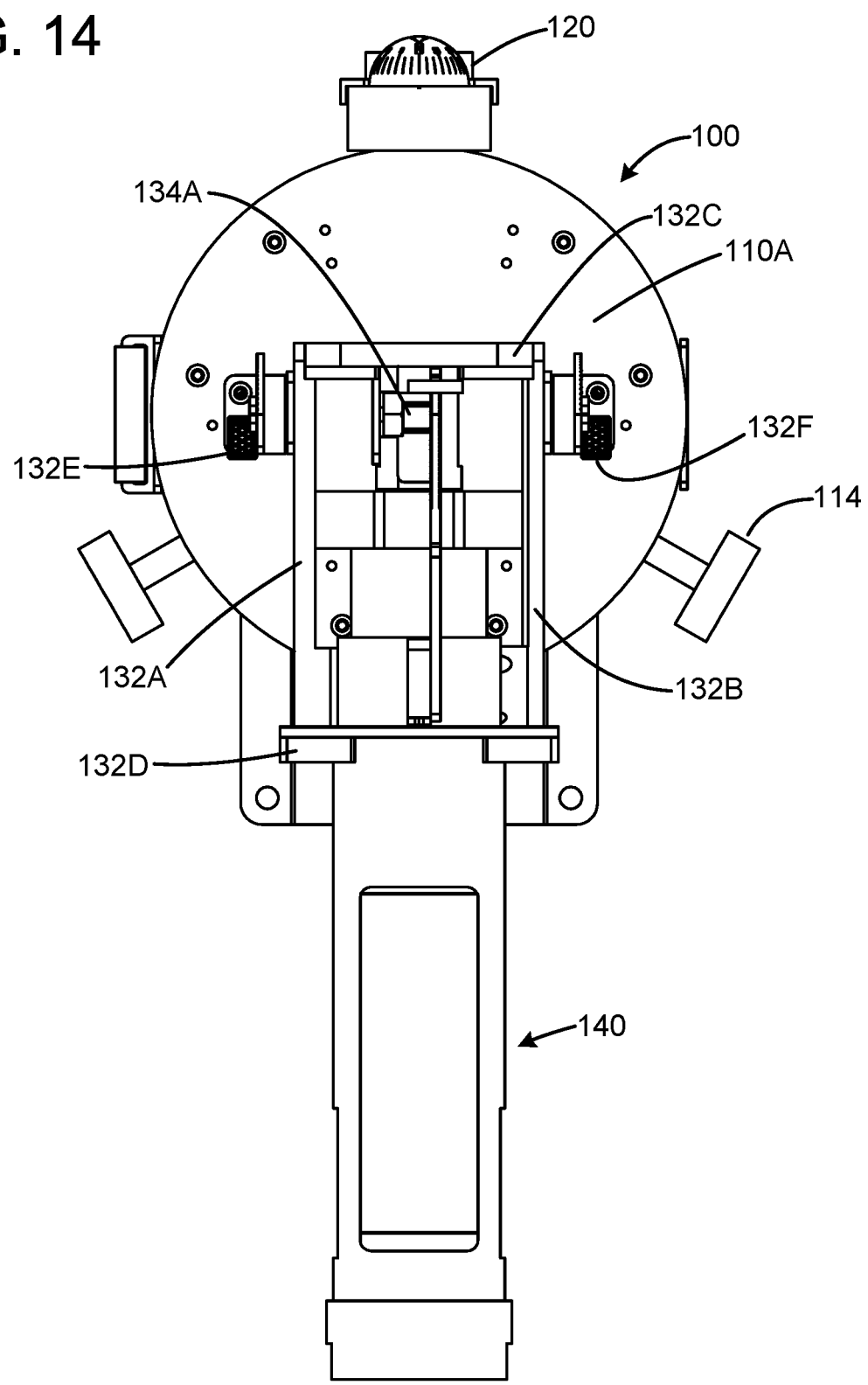
FIGS. 14, 15 and 16 are respective front, right and top views of the flame detector and verification system of FIG. 13.
Figure 15:
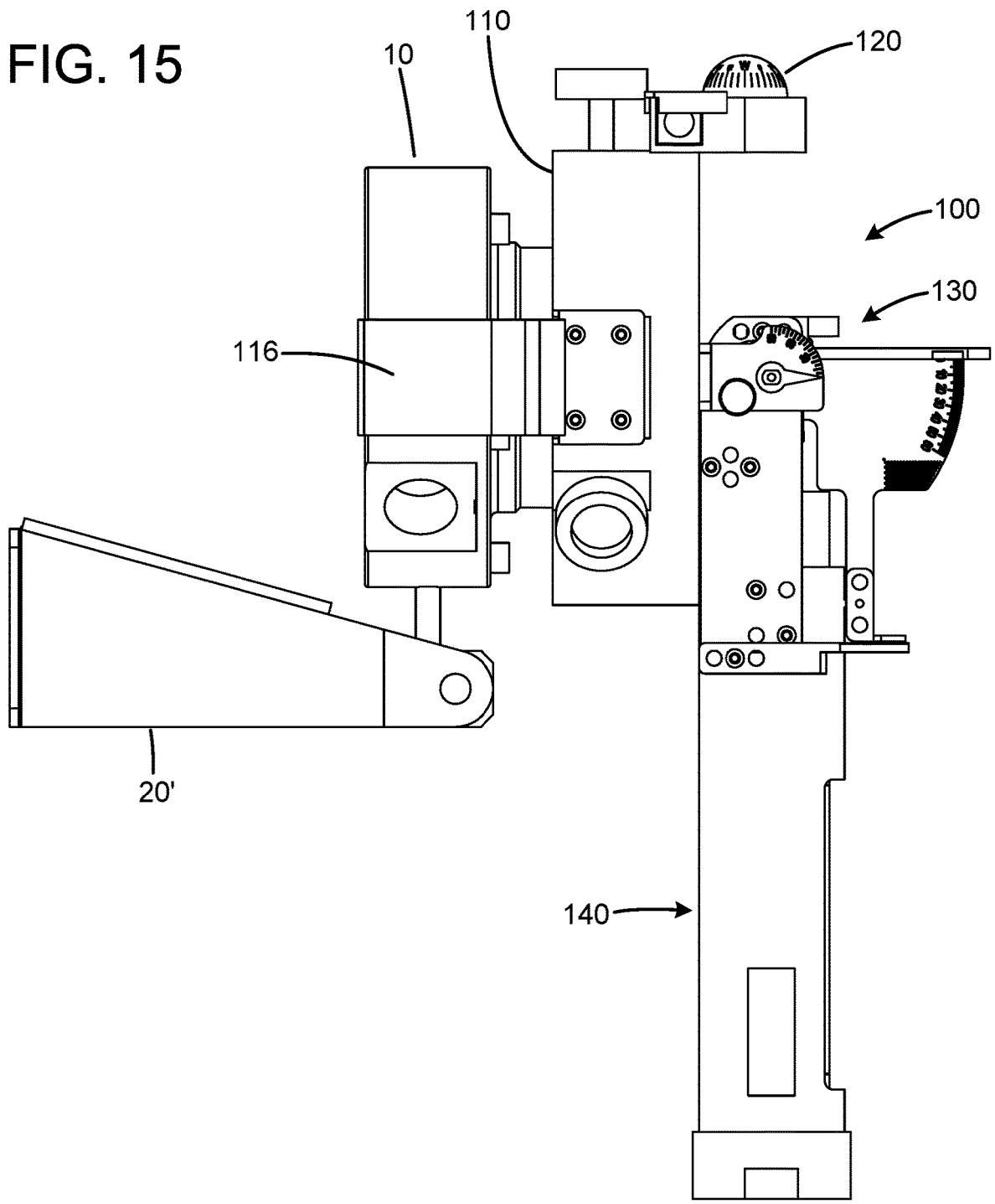
Figure 16:
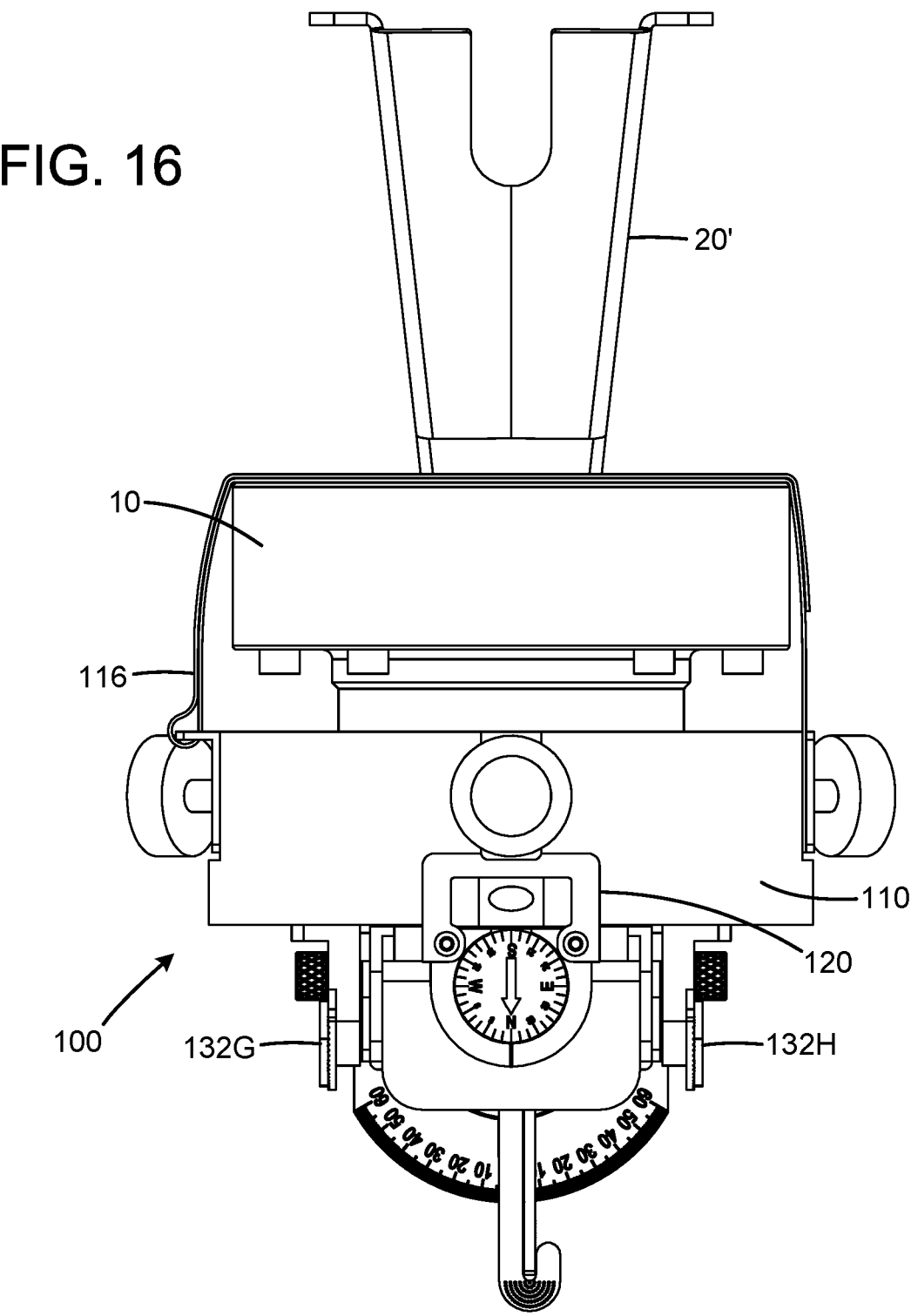

The system 100 further includes the compass and level assembly 120, attached to the wall portion 110B of the hub structure at a location to be oriented at the top of the hub structure when attached to the flame detector, as in FIG. 13. The compass 122 indicates the pointing direction of the flame detector in relation to magnetic north as with the system 50, and the level 124 is used to ensure that the system 100 is correctly leveled on the flame detector 10, with the level bubble 124A between the margin lines 124B, 124C.

Figure 20:
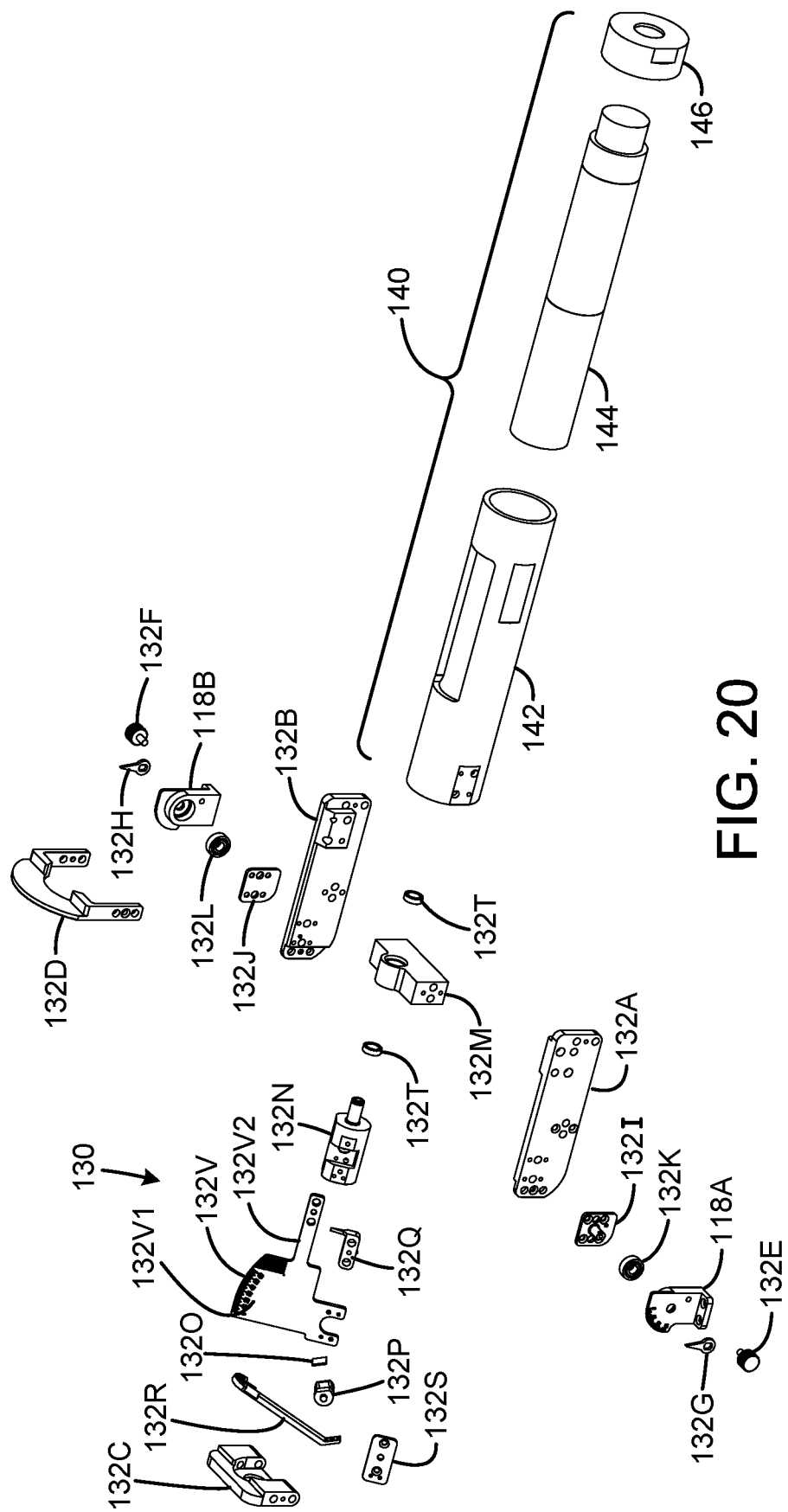
FIG. 20 is an exploded isometric view of control unit and laser module of the system of FIG. 13.

The light path control unit 130, shown in further detail in FIG. 20, is mounted for pivotable movement, to the exterior of the base plate 110A of the hub structure 110 on brackets 118A, 118B. The control unit 130 includes a frame structure including left and right side plates 132A, 132B, top plate 132C and bottom plate 132D. The laser module holder 142 of the laser module is secured to the left and right side plates by threaded fasteners. The left and right side plates 132A, 132B are pivotally attached to the brackets 118A, 118B on bearings 132K, 132L mounted on shafts 132I, 132J fixed to the respective side plates, to provide a pivotable connection between the hub structure 110 and the control unit 130. Tilt angle pointers 132G, 132H are fitted onto the bearing shafts, and cooperate with the tilt scales 118A1, 118B1 marked on the brackets 118A, 118B to show the tilt angle of the control unit 130 relative to the hub structure. With the lock screws 132A, 132B in a loosened condition, the control unit and laser module are allowed to swing down with the force of gravity, so that the laser module will be perpendicular to the ground plane, even with the flame detector oriented at different declination angles. The position of the control unit 130 may then be fixed by tightening lock screws 132E, 132F fitted into threaded bores in the brackets 118A, 118B, to tighten against surfaces of the side plates 132A, 132B, to fix the position of the control unit 130 and the laser module 140 relative to the hub structure.

As with the device 50, the control unit 130 includes a mirror 132O to redirect the laser light beam generated by the laser module 140. The mirror 130O is configured for rotational movement about two axis, to allow movement of the beam in the tilt angle or declination angle direction, and to allow movement of the beam in the orthogonal direction, the pan direction. To achieve this range of movement in this exemplary embodiment, the mirror 132O is mounted on a mirror spindle 132P, in turn mounted for pivotal movement between mirror holder 132N, scale plate 132V and holder cover 132S. An angle pointer 132R is attached to the mirror spindle to control the rotation of the mirror about the spindle axis, and to indicate the mirror pointing direction on the scale 132V1 of the scale plate 132V. The device user manually moves the angle pointer 132R to the desired pointing direction, to position the mirror pointing direction in relation to scale plate 132V and scale 132V1.

To allow rotation of the mirror 132O in the Alpha (pan) direction, the mirror holder 132N is mounted to bearing holder 132M by bearings 132T, for pivotal movement about the axis of the bearing holder. The bearing holder 132M is fixed between the side plates 132A, 132B. The alpha angle is indicated by the position of the pointer 132Q, affixed to the leg portion 132V2 of the scale plate 132V, on the scale marked on the bottom plate 132D, e.g. shown in FIG. 13. The device user manually moves the pointer 132Q to the desired pointing direction, to position the mirror in the pan or alpha direction.

Figure 17:
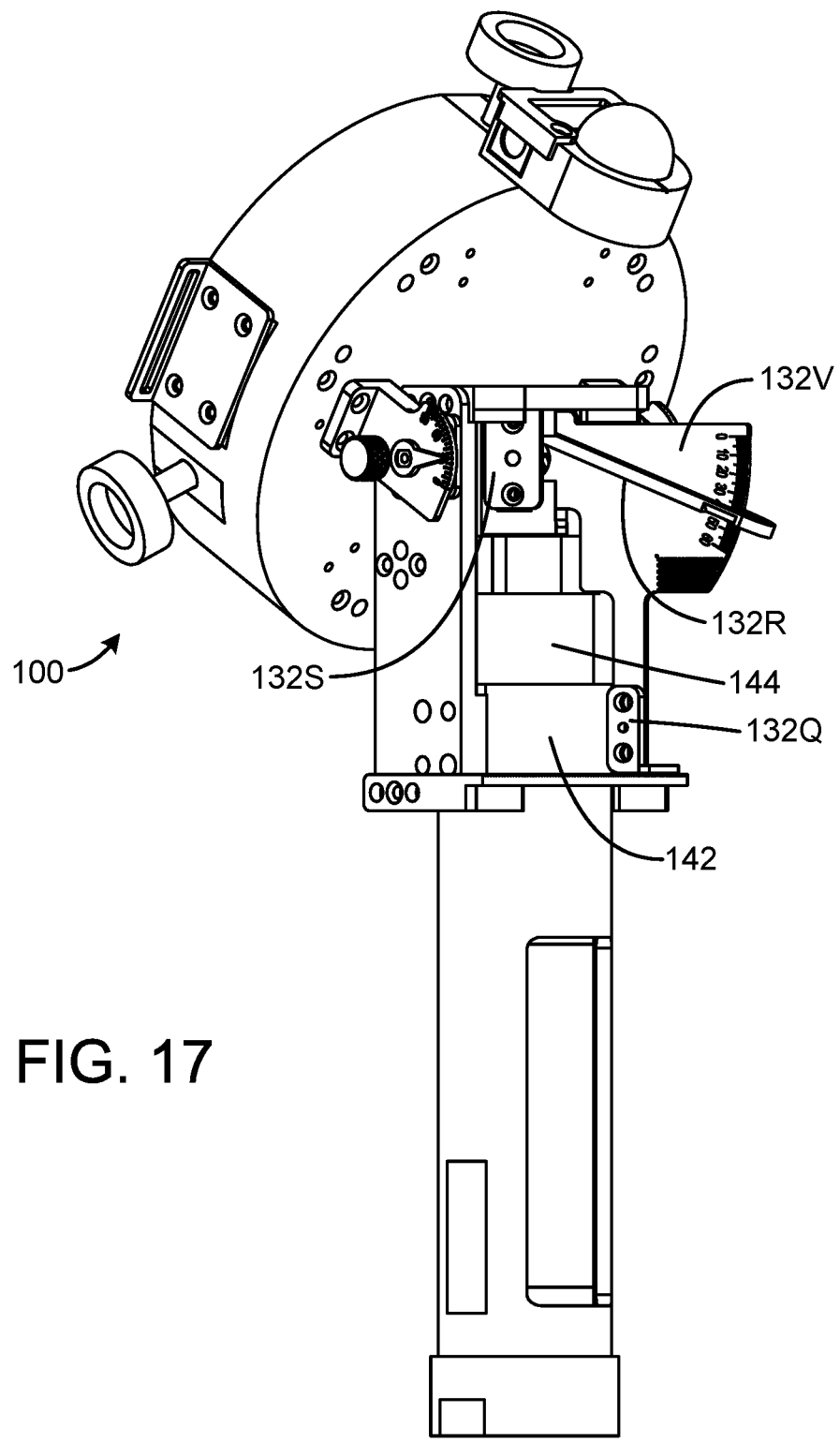
FIG. 17 is an isometric view of the verification system of FIG. 13.
Figure 17B:
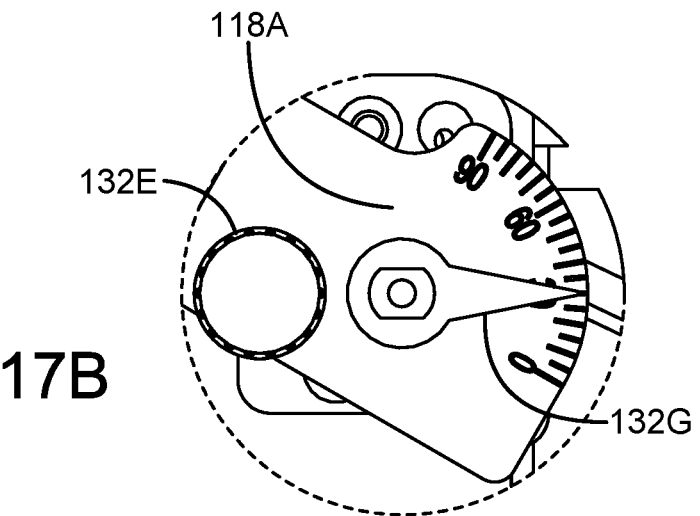
FIG. 17B is a close-up view of the portion of FIG. 17A within circle 17B.
Figure 17A:
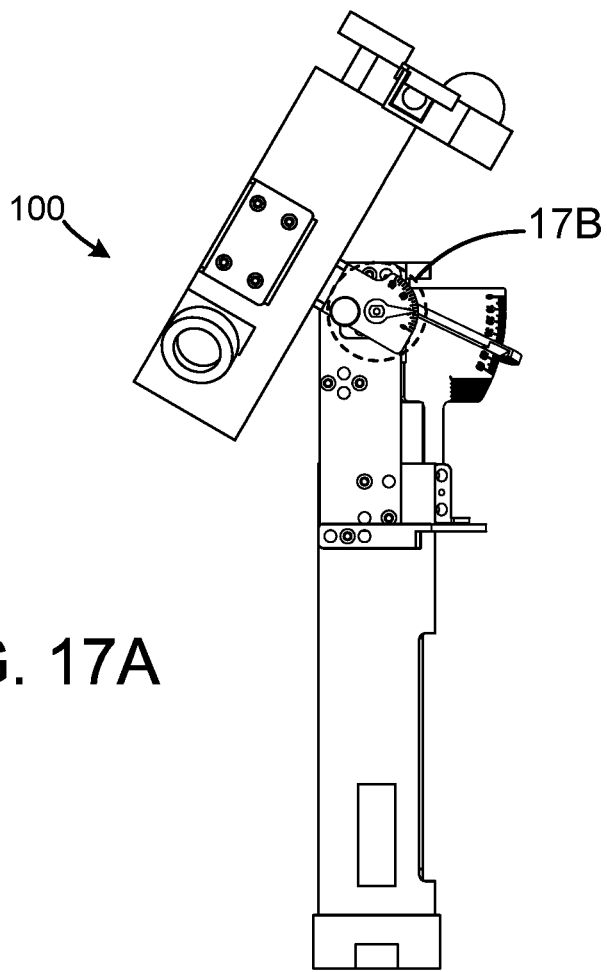
FIG. 17A is a right side view of the system as in FIG. 17.
Figure 18:
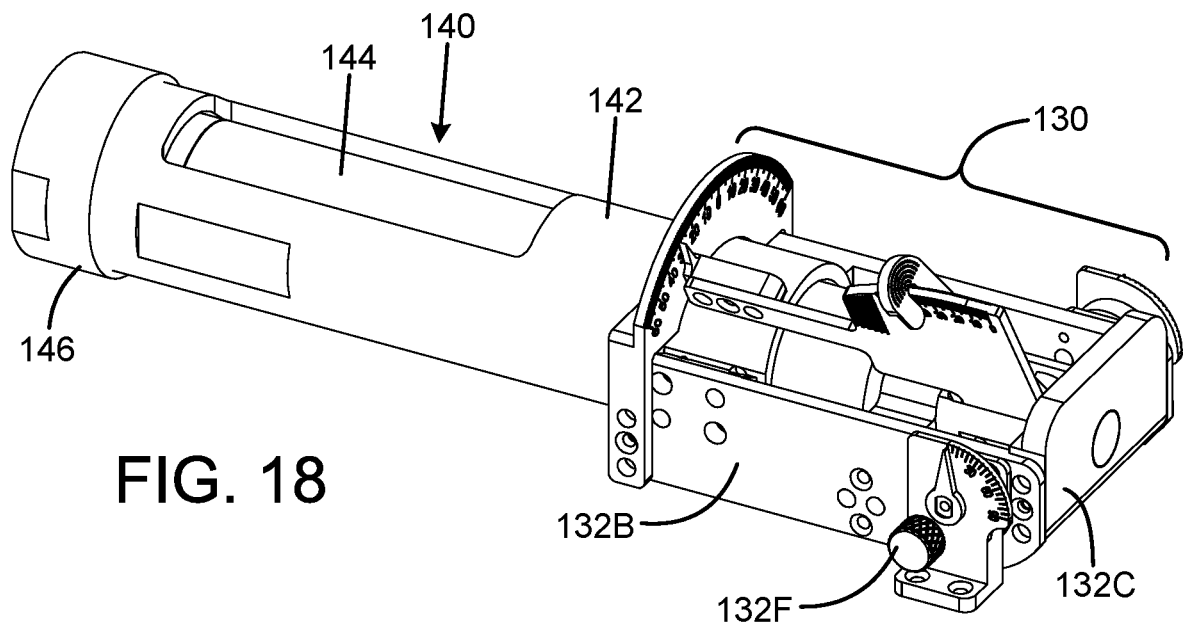
FIG. 18 is an isometric view of a portion of the system of FIG. 17, showing the laser module and light trace controller section.

The laser module 140 includes the laser housing 142, the laser 144, and a lid 146 to secure the laser module in the housing. The system 100 may be employed by a field engineer to set up a flame detector to a predetermined position, typically determined by a simulation study or software application. The system is attached to the fielded flame detector, in the manner described above, after selecting and installing the appropriate adapter set for the particular flame detector model. The level 124 is used to place the system 100 on the detector 10 in a level position, and the thumbscrews 114 are tightened to fix the system 100 in place, and the safety strap 116 secured over the detector 10. The angular orientation of the detector 10 may be adjusted to the predetermined direction, by loosening the bracket clamp and using the compass 122. With the thumbscrews 132E, 132F (FIGS. 13 and 14) loosened to allow the laser module and control unit to rotate freely so that the laser module is perpendicular to the ground plane, the typically predetermined declination angle of the detector is adjusted, with the tilt pointers 132G, 132H indicating the tilt angle, as shown in FIGS. 17A and 17B. Once the desired declination tilt angle has been achieved, the detector bracket clamp is tightened to fix the detector on the bracket. The thumbscrews 132E, 132F on the control unit are tightened, to fix the position of the control unit frame and the laser module in relation to the hub structure 110 and the detector. The angle pointer 132R can then be used to adjust the beta position of the light beam, and the alpha angle pointer can be used to adjust the alpha position of the beam, typically to angular ranges already known for the detector model.

Figure 21A:
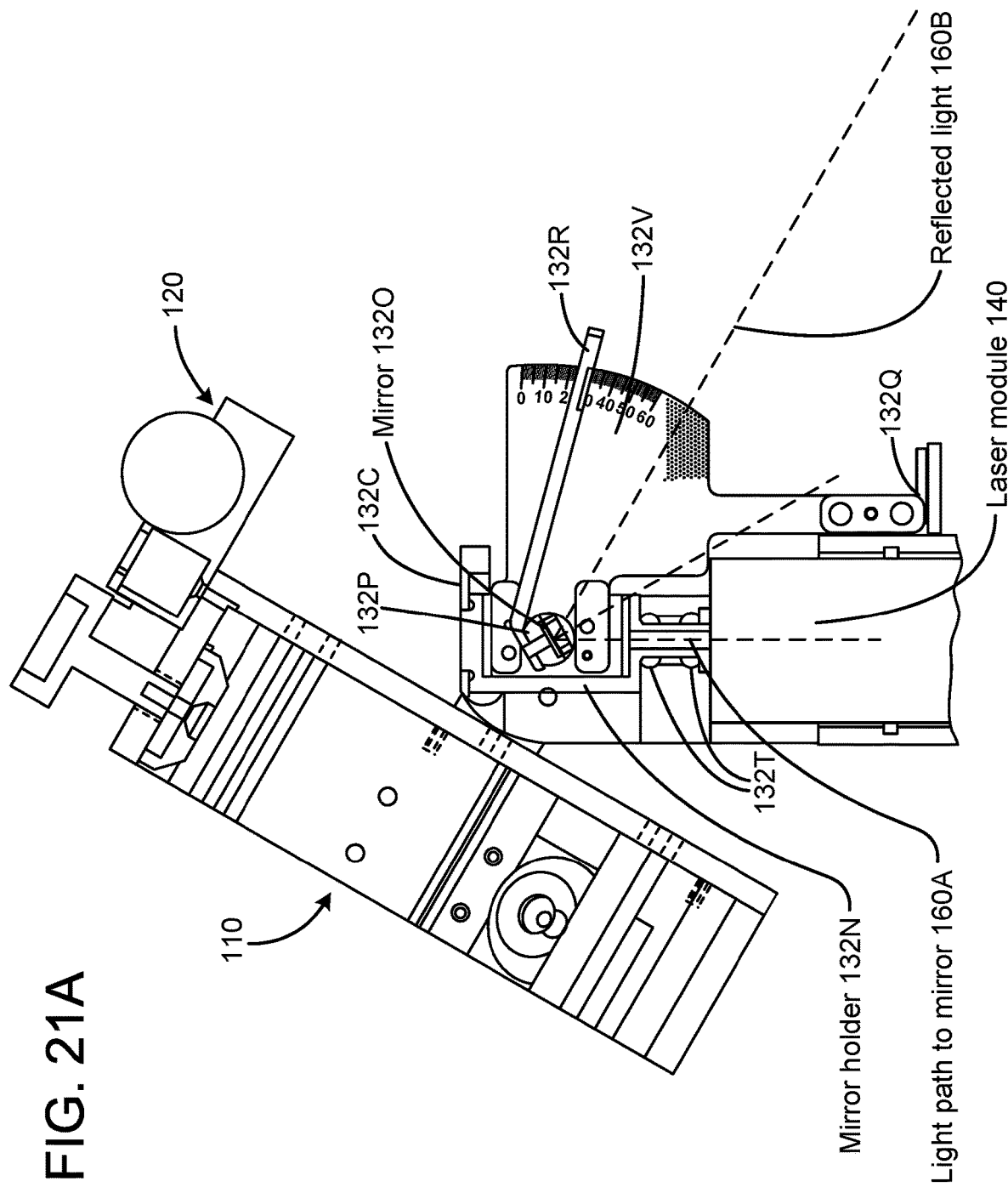
FIG. 21A is a diagrammatic cutaway view of the control unit and laser module, showing the laser light path through the control unit.

FIG. 21A illustrates the laser beam light path through the control unit 130. The light beam 160A from the laser module 140 passes through the hollow bore 132N1 (FIG. 20) in the mirror holder 132N, and impinges on the mirror 132O mounted on the mirror spindle 132P, which reflects the light beam as the reflected beam 160B. The rotational position or tilt angle of the mirror relative to the axis of the mirror is controllable by moving the angle pointer 132R. The pan or alpha angle of the mirror is controllable by moving the scale plate 132V to rotate the mirror holder 132N about the bearings 132T.

Figure 21B:
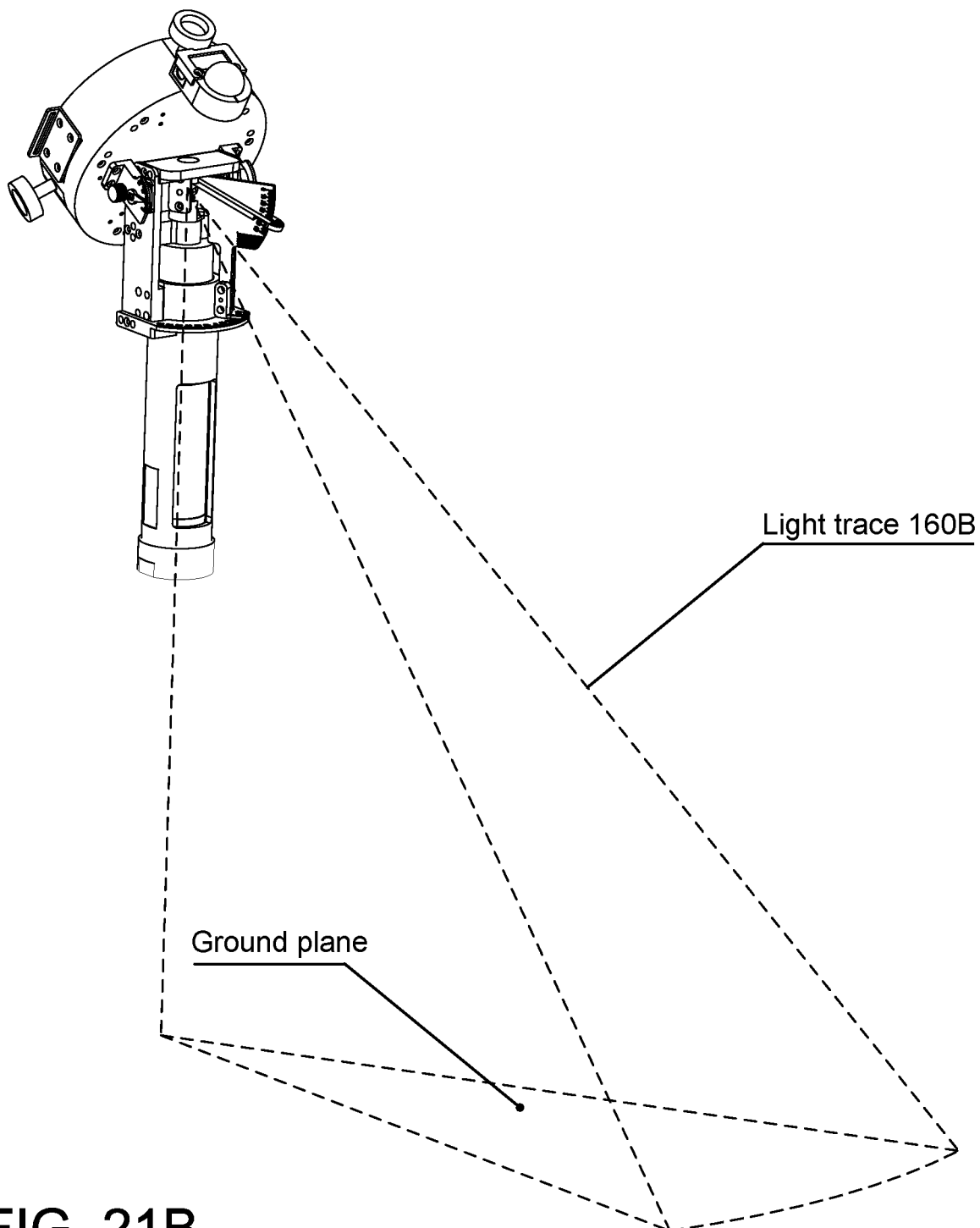
FIG. 21B shows the reflected light trace at different pan directions.
Figure 21D:
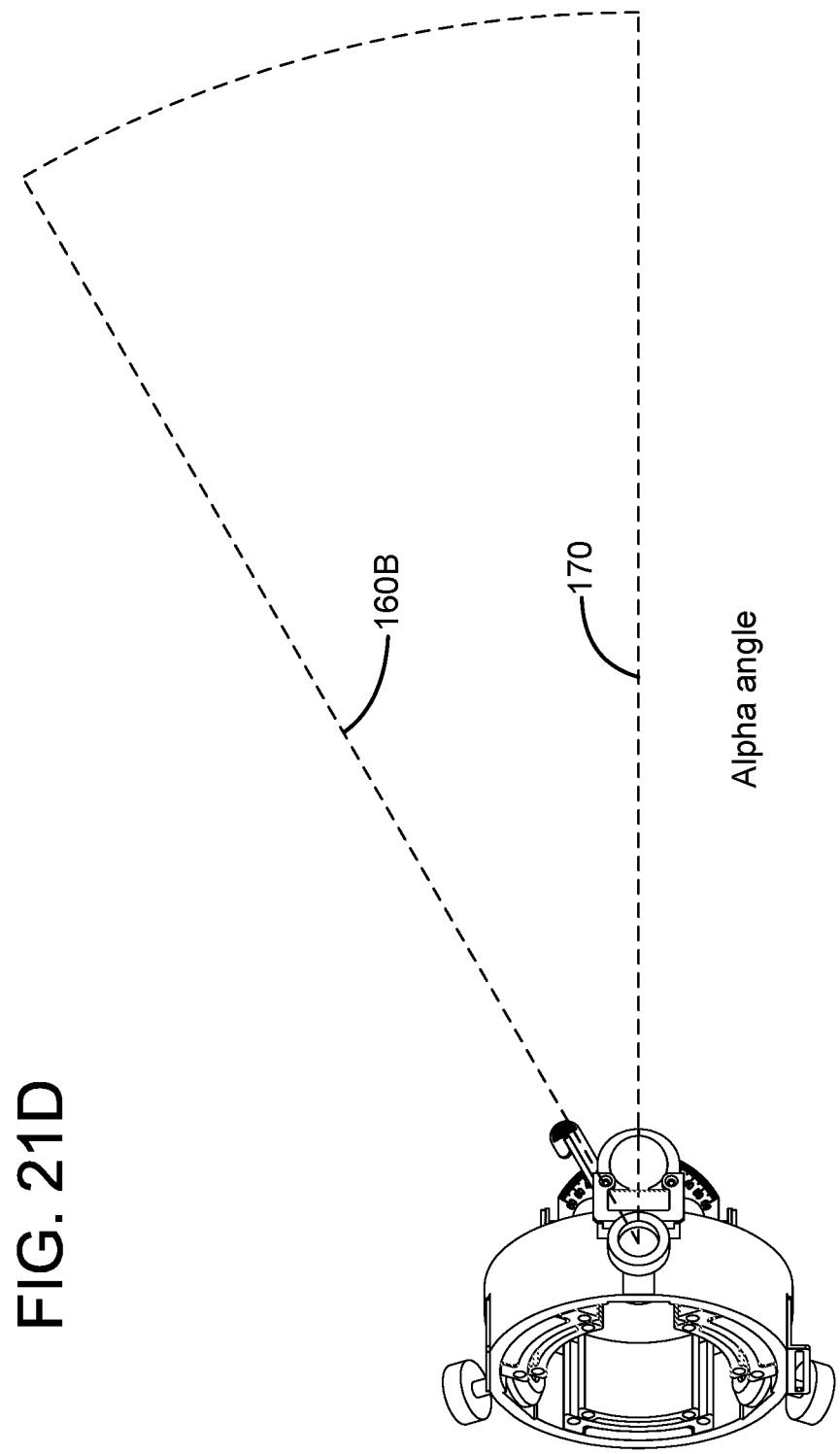
FIG. 21D shows the reflected light beam at a pan angle relative to the center line of the system.

FIG. 21B illustrates the reflected light beam or trace 160B in different pan positions. FIG. 21C shows an exemplary tilt angle position of the system 100 with control unit 130 positioning the laser module 140 in a vertical position perpendicular to the ground plane orientation. FIG. 21D illustrates an exemplary alpha angular positioning of the reflected light beam 160B relative to the center position of the system 100.

Although the foregoing has been a description and illustration of specific embodiments of the subject matter, various modifications and changes thereto can be made by persons skilled in the art without departing from the scope and spirit of the invention.

What is claimed is:

1. A flame detector coverage verification system for a flame detector having a field of view, the system comprising:
   an optical source for generating a light beam;
   a light-path control unit connected to the optical source and configured to direct the beam through a range of movements about a center line direction of the flame detector to visually demarcate an area that falls within the flame detector's field of view;
   an indicator device configured to visually indicate a pan direction of the flame detector with respect to a defined direction;
   a tilt indicator configured to determine and visually display a tilt angle of the flame detector with respect to a ground plane; and
   a hub structure configured to temporarily attach the control unit to the flame detector, the control unit pivotally connected to the hub structure so that the optical source light beam is configured to be oriented perpendicular to a ground plane even with the flame detector disposed at different tilt angles.

2. The system of claim 1, wherein the optical source is a laser configured to generate a visible beam.

3. The system of claim 2, wherein the laser is an intrinsically safe device.

4. The system of claim 1, wherein the indicator device is a compass.

5. The system of claim 1, wherein the control unit comprises a mirror for reflecting the light beam and a mirror rotator system, the rotator system configured to reflect the light beam through the range of movement in a pan direction and in a tilt direction.

6. The system of claim 5, further comprising an indication device configured to indicate angular deflection of the light beam from the center line direction in a pan direction.

7. The system of claim 6, wherein the indication device comprises a pointer connected to the mirror rotator system, and indicia formed on a scale plate fixed to the control unit, the pointer indicating the angular deflection in pan.

8. The system of claim 5, further comprising an indicator connected to the mirror rotator system and tilt indicia on a scale plate carried by the mirror rotator system, a position of the indicator in relation to the tilt indicia indicative of the tilt angle of the beam.

9. The system of claim 1, wherein the hub structure includes a hollow structure having a base plate and a wall portion defining a detector receptacle, configured to be placed over a sensor end of the detector, and a fixing system to secure the hub structure in place on the sensor end during a detector setup, and to allow the hub structure to be readily removed from the detector after completion of a detector setup.

10. The system of claim 9, wherein the fixing system includes at least one thumbscrew and a securing strap.

11. The system of claim 1, wherein the tilt indicator comprises a tilt angle pointer mounted for rotation on a pivot connection of the control unit to the hub structure, and angle indicia on a bracket attached to the hub structure and supporting the pivot connection.

12. The system of claim 1, wherein the hub structure is arranged to accommodate flame detectors of different sizes.

13. A flame detector coverage verification system for a flame detector having a field of view, comprising:
an optical source for generating a light beam;
a light-path control unit coupled to the optical source and configured to direct the beam through a range of movement about an optical center line direction of the detector to visually demarcate an area that falls within the flame detector's field of view;
a hub structure for temporarily mounting the optical source and the control unit to an installed flame detector oriented to a detector declination angle, the control unit pivotally connected to the hub structure so that the optical source is oriented perpendicular to a ground plane during a set up procedure;
wherein the control unit comprises a mirror for reflecting the light beam and a mirror actuator mechanism, the mirror actuator mechanism configured to position the mirror to reflect the light beam through the range of movement.

14. The system of claim 13, wherein the hub structure is configured includes one or more adapter sets to accommodate flame detectors of different sizes or configurations.

15. The system of claim 13, wherein the control unit comprises a mirror spindle for mounting the mirror, the mirror spindle arranged for pivoting movement to rotate the mirror about a first axis, and a rotatable mirror holder structure holding the mirror and mirror spindle, the rotatable mirror holder structure configured for rotation about a second axis transverse to the first axis.

16. The system of claim 15, further comprising:
an indicator device system configured to visually indicate a pan direction of the light beam and a tilt direction of the light beam; and
a declination indicator configured to determine and visually display the declination angle with respect to a ground plane.

17. The system of claim 16, wherein the declination indicator comprises a tilt angle pointer mounted for rotation on a pivot connection of the control unit to the hub structure, and angle indicia on a bracket attached to the hub structure and supporting the pivot connection, the position of the pointer relative to the angle indicia indicating the angle of declination.

18. The system of claim 16, wherein the indicator device system includes an angle pointer connected to the mirror spindle for controlling the position of the mirror relative to the tilt direction of the light beam, and tilt angle indicia on a scale plate fixed to the mirror holder structure.

19. The system of claim 16, wherein the indicator device system includes a pointer coupled to the mirror holder structure and pan angle indicia fixed to the control unit.

20. The system of claim 13, further comprising a compass mounted to the control unit for indicating a direction of the optical center line relative to North, and a level for indicating a position of the control unit on the flame detector relative to an azimuth or horizontal direction.

* * * * *